US012746902B2

(12) United States Patent
Jung

(10) Patent No.: US 12,746,902 B2
(45) Date of Patent: Sep. 29, 2026

(54) BRAKE SYSTEM AND METHOD OF CONTROLLING THE SAME

(71) Applicant: HL MANDO CORPORATION, Gyeonggi-do (KR)

(72) Inventor: Yongkyun Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 39 days.

(21) Appl. No.: 19/040,865

(22) Filed: Jan. 30, 2025

(65) Prior Publication Data

US 2026/0034971 A1 Feb. 5, 2026

(30) Foreign Application Priority Data

Aug. 2, 2024 (KR) ........................ 10-2024-0103082

(51) Int. Cl.
*B60T 8/88* (2006.01)
*B60T 13/74* (2006.01)

(52) U.S. Cl.
CPC ............ *B60T 8/885* (2013.01); *B60T 13/741* (2013.01); *B60T 13/745* (2013.01);
(Continued)

(58) Field of Classification Search
CPC ...... B60T 8/885; B60T 13/741; B60T 13/745; B60T 13/748; B60T 2270/402; B60T 2270/416
(Continued)

(56) References Cited

U.S. PATENT DOCUMENTS 5,795,039 A * 8/1998 Fennel .................... B60T 8/885
303/122.12
11,964,648 B2 * 4/2024 Bornemann .......... B60T 8/1755
(Continued)

FOREIGN PATENT DOCUMENTS

JP 6605248 11/2019
KR 10-2021-0099420 8/2021
(Continued)

OTHER PUBLICATIONS

English translation of KR 10 2024 0011903; Publication Date Jan. 29, 2024; Inventor Jong-Seong Kim (Year: 2024).*
(Continued)

*Primary Examiner* — Erick R Solis
(74) *Attorney, Agent, or Firm* — WOMBLE BOND DICKINSON (US) LLP

(57) ABSTRACT

The present disclosure relates to a brake system and a method of controlling the same, the brake system including first and second wheel speed sensors respectively installed in wheels of a vehicle, electrohydraulic brakes respectively installed in front wheels of the vehicle, electromechanical brakes (EMBs) respectively installed in rear wheels of the vehicle, and a first controller configured to perform braking control on the electrohydraulic brakes and the electromechanical brakes based on a first front wheel speed signals outputted from the first wheel speed sensors installed in the front wheels, in which when a failure of the first wheel speed sensors installed in the front wheels are identified, the first controller performs the braking control on the electrohydraulic brakes and the electromechanical brakes based on the first rear wheel speed signals outputted from the first wheel speed sensors installed in the rear wheels.

20 Claims, 15 Drawing Sheets

(52) U.S. Cl.
CPC ....... *B60T 13/748* (2013.01); *B60T 2270/413* (2013.01); *B60T 2270/416* (2013.01)

(58) Field of Classification Search
USPC ............................................................ 701/76
See application file for complete search history.

(56) References Cited

U.S. PATENT DOCUMENTS

| | | | | |
|---|---|---|---|---|
| 2013/0282249 | A1* | 10/2013 | Heise | B60T 13/746 701/70 |
| 2023/0138862 | A1 | 5/2023 | Kim | |
| 2023/0242085 | A1* | 8/2023 | Beuss | B60T 8/321 188/158 |
| 2026/0074552 | A1* | 3/2026 | Meszaros | B60T 17/22 |

FOREIGN PATENT DOCUMENTS

| | | |
|---|---|---|
| KR | 10-2021-0147487 | 12/2021 |
| KR | 10-2022-0086046 | 6/2022 |
| KR | 10-2536986 | 5/2023 |
| KR | 10-2023-0163600 | 12/2023 |
| KR | 10-2024-0011903 | 1/2024 |

OTHER PUBLICATIONS

Office Action (1st) dated Jan. 20, 2026 for Korean Patent Application No. 10-2024-0103082 and its English translation provided by Applicant's foreign counsel.

* cited by examiner

BRAKE SYSTEM AND METHOD OF CONTROLLING THE SAME

CROSS-REFERENCE TO RELATED APPLICATIONS

This application claims the priority of Korean Patent Application No. 10-2024-0103082 filed on Aug. 2, 2024, in the Korean Intellectual Property Office, the disclosure of which is incorporated herein by reference.

BACKGROUND

Field

The disclosed disclosure relates to a brake system, which performs dualized braking control on an electromechanical brake by means of a wheel speed sensors provided as redundancy, and a method of controlling the same.

Description of the Related Art

With the advancement of vehicle technologies and the increasing demand for safety of drivers and occupants, there is a need for more efficient, safer braking systems. A hydraulic brake system in the related art provides a predetermined level of braking performance by generating a braking force by converting an operating force of a brake pedal into hydraulic pressure. However, the hydraulic brake system has a limitation in terms of a reaction speed and accuracy and has a problem in that efficiency is degraded by complexity and weight of a hydraulic system.

An integrated dynamic brake (IDB) system developed to solve the above-mentioned problem electrohydraulically controls a braking force by converting the operating force of the brake pedal into an electrical signal. The IDB refers to an integrated electromechanical brake made by combining an electronic booster and electronic stability control (ESC). The IDB may more quickly and accurately brake the vehicle and easily distribute the braking force, thereby providing further improved stability and braking performance in comparison with the hydraulic system in the related art. In addition, the IDB may substitute for the hydraulic system, simplify the system, and reduce the weight, thereby providing a significant advantage even in terms of efficiency.

Meanwhile, the electromechanical brake (EMB) refers to a brake that operates by operating a mechanical actuator without using hydraulic pressure in the related art, which advantageously enables quick responsiveness and precise control. The electromechanical brake generates a braking force by operating a caliper by operating a motor in response to an electrical signal. However, in the case of an internal combustion engine vehicle or a hybrid vehicle in the related art, an electromechanical brake, which has a general shape without using an electronic wedge caliper (electronic wedge brake (EWB)), cannot be applied to front wheels because a braking force capable of being generated by a voltage of 12 V is limited.

SUMMARY

An object to be achieved by the present disclosure is to provide a brake system, which is capable of being connected to dual wheel speed sensors respectively installed in vehicle wheels and performing dualized braking control on electrohydraulic brakes of front wheels and electromechanical brakes of rear wheels, and a method of controlling the same.

A brake system according to one aspect of the disclosed disclosure may include: first and second wheel speed sensors respectively installed in wheels of a vehicle; electrohydraulic brakes respectively installed in front wheels of the vehicle; electromechanical brakes (EMBs) respectively installed in rear wheels of the vehicle; and a first controller configured to perform braking control on the electrohydraulic brakes and the electromechanical brakes based on first front wheel speed signals outputted from the first wheel speed sensors installed in the front wheels, in which when a failure of the first wheel speed sensors installed in the front wheels are identified, the first controller performs the braking control on the electrohydraulic brakes and the electromechanical brakes based on the first rear wheel speed signals outputted from the first wheel speed sensors installed in the rear wheels.

The brake system may further include: a second controller configured to perform braking control on the electrohydraulic brakes and the electromechanical brakes based on second rear wheel speed signals outputted from the second wheel speed sensors installed in the rear wheels in response to a failure of the first controller.

The brake system may further include: a first internal network configured to connect the first controller and the second controller, in which the first controller and the second controller identify states thereof through the first internal network.

The brake system may further include: a second internal network configured to connect the first controller and the second controller, in which the first controller and the second controller identify states thereof through the first internal network and the second internal network.

When a failure of the second wheel speed sensors installed in the rear wheels are identified, the second controller may perform the braking control on the electrohydraulic brakes and the electromechanical brakes based on second front wheel speed signals outputted from the second wheel speed sensors installed in the front wheels.

The brake system may further include: a first hydraulic pressure supply device configured to supply hydraulic pressure to the electrohydraulic brakes by being operated by a first motor, in which the first controller controls the first motor so that the first hydraulic pressure supply device supplies the hydraulic pressure to the electrohydraulic brakes.

The second controller may control the first motor so that the first hydraulic pressure supply device supplies the hydraulic pressure to the electrohydraulic brakes in response to the failure of the first controller.

The brake system may further include: a second hydraulic pressure supply device configured to supply hydraulic pressure to the electrohydraulic brakes by being operated by a second motor, in which the second controller controls the second motor so that the second hydraulic pressure supply device supplies the hydraulic pressure to the electrohydraulic brakes.

The first controller may perform cooperative control for regenerative braking based on the first front wheel speed signals or the first rear wheel speed signals.

The second controller may perform cooperative control for regenerative braking based on the second rear wheel speed signals or the second front wheel speed signals in response to the failure of the first controller.

A method of controlling a brake system, which includes first and second wheel speed sensors respectively installed in wheels of a vehicle, electrohydraulic brakes installed in front wheels of the vehicle, and electromechanical brakes installed in rear wheels of the vehicle, according to another aspect of the disclosed disclosure may include: performing, by a first controller, braking control on the electrohydraulic brakes and the electromechanical brakes based on a first front wheel speed signals outputted from the first wheel speed sensors installed in the front wheel; and performing, by the first controller, braking control on the electrohydraulic brakes and the electromechanical brakes based on first rear wheel speed signals outputted from the first wheel speed sensors installed in the rear wheels when a failure of the first wheel speed sensors installed in the front wheels are identified.

The method may further include: identifying, by the first controller and a second controller, states thereof; and performing, by the second controller, braking control on the electrohydraulic brakes and the electromechanical brakes based on second rear wheel speed signals outputted from the second wheel speed sensors installed in the rear wheels in response to a failure of the first controller.

The method may further include: performing, by the second controller, braking control on the electrohydraulic brakes and the electromechanical brakes based on second front wheel speed signals outputted from the second wheel speed sensors installed in the front wheels when a failure of the second wheel speed sensors installed in the rear wheels are identified.

The method may further include: controlling, by the first controller, a first motor so that a first hydraulic pressure supply device operated by the first motor supplies hydraulic pressure to the electrohydraulic brakes.

The method may further include: controlling, by the second controller, the first motor so that the first hydraulic pressure supply device supplies hydraulic pressure to the electrohydraulic brakes in response to the failure of the first controller.

The method may further include: controlling, by the second controller, a second motor so that a second hydraulic pressure supply device operated by the second motor supplies hydraulic pressure to the electrohydraulic brakes in response to the failure of the first controller.

The method may further include: performing, by the first controller, cooperative control for regenerative braking based on the first front wheel speed signals or the first rear wheel speed signals.

The method may further include: performing, by the second controller, cooperative control for regenerative braking based on the second rear wheel speed signals or the second front wheel speed signals in response to the failure of the first controller.

A brake system according to still another aspect of the disclosed disclosure may include: first and second wheel speed sensors respectively installed in wheels of a vehicle; electrohydraulic brakes respectively installed in front wheels of the vehicle; electromechanical brakes (EMBs) respectively installed in rear wheels of the vehicle; a first controller configured to perform braking control on the electrohydraulic brakes and the electromechanical brakes based on first front wheel speed signals outputted from the first wheel speed sensors installed in the front wheels; and a second controller configured to perform braking control on the electrohydraulic brakes and the electromechanical brakes based on second rear wheel speed signals outputted from the second wheel speed sensors installed in the rear wheels in response to a failure of the first controller, in which when a failure of the first wheel speed sensors installed in the front wheels are identified, the first controller performs the braking control on the electrohydraulic brakes and the electromechanical brakes based on first rear wheel speed signals outputted from the first wheel speed sensors installed in the rear wheels.

When a failure of the second wheel speed sensors installed in the rear wheels are identified, the second controller may perform the braking control on the electrohydraulic brakes and the electromechanical brakes based on second front wheel speed signals outputted from the second wheel speed sensors installed in the front wheels among the second wheel speed sensors.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
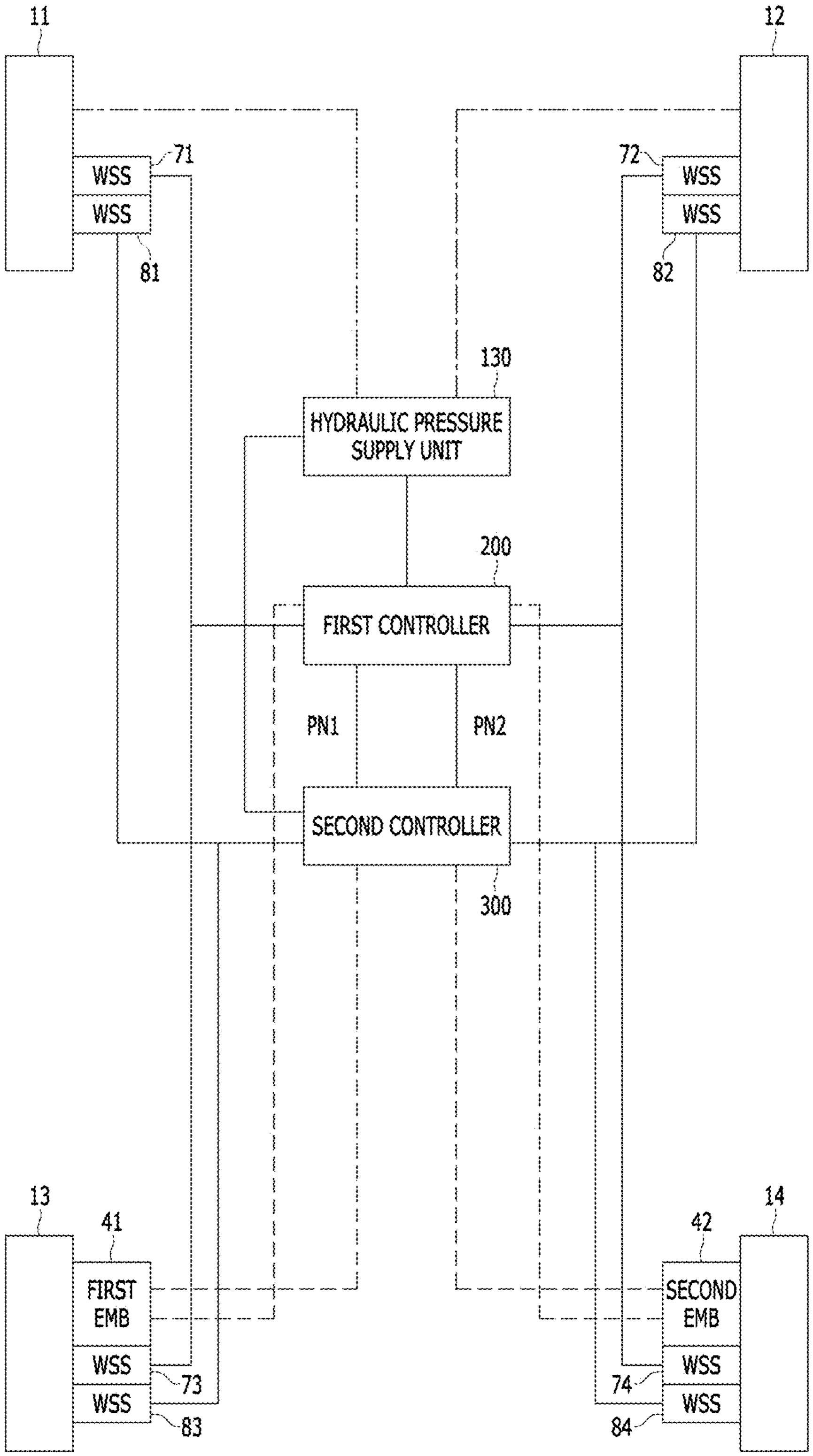
FIG. 1 is a view illustrating a brake system included in a vehicle according to a first embodiment.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Like reference numerals indicate like constituent elements throughout the specification. The present specification does not explain all the elements in the embodiments, and the general contents in the technical field to which the disclosed disclosure pertains or the contents repeatedly described in the embodiments will be omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the present specification, when one constituent element is referred to as being "connected to" another constituent element, one constituent element can be "directly connected to" the other constituent element, and one constituent element can also be "indirectly connected to" the other constituent element. The indirect connection includes a connection through a wireless communication network.

In addition, unless explicitly described to the contrary, the word "comprise/include" and variations such as "comprises/includes" or "comprising/including" will be understood to imply the inclusion of stated elements, not the exclusion of any other elements.

Throughout the specification, when one member is disposed "on" another member, this includes not only a case where the one member is brought into contact with another member, but also a case where still another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, operation principles and embodiments of the disclosed disclosure will be described in detail with reference to the accompanying drawings.

Figure 2:
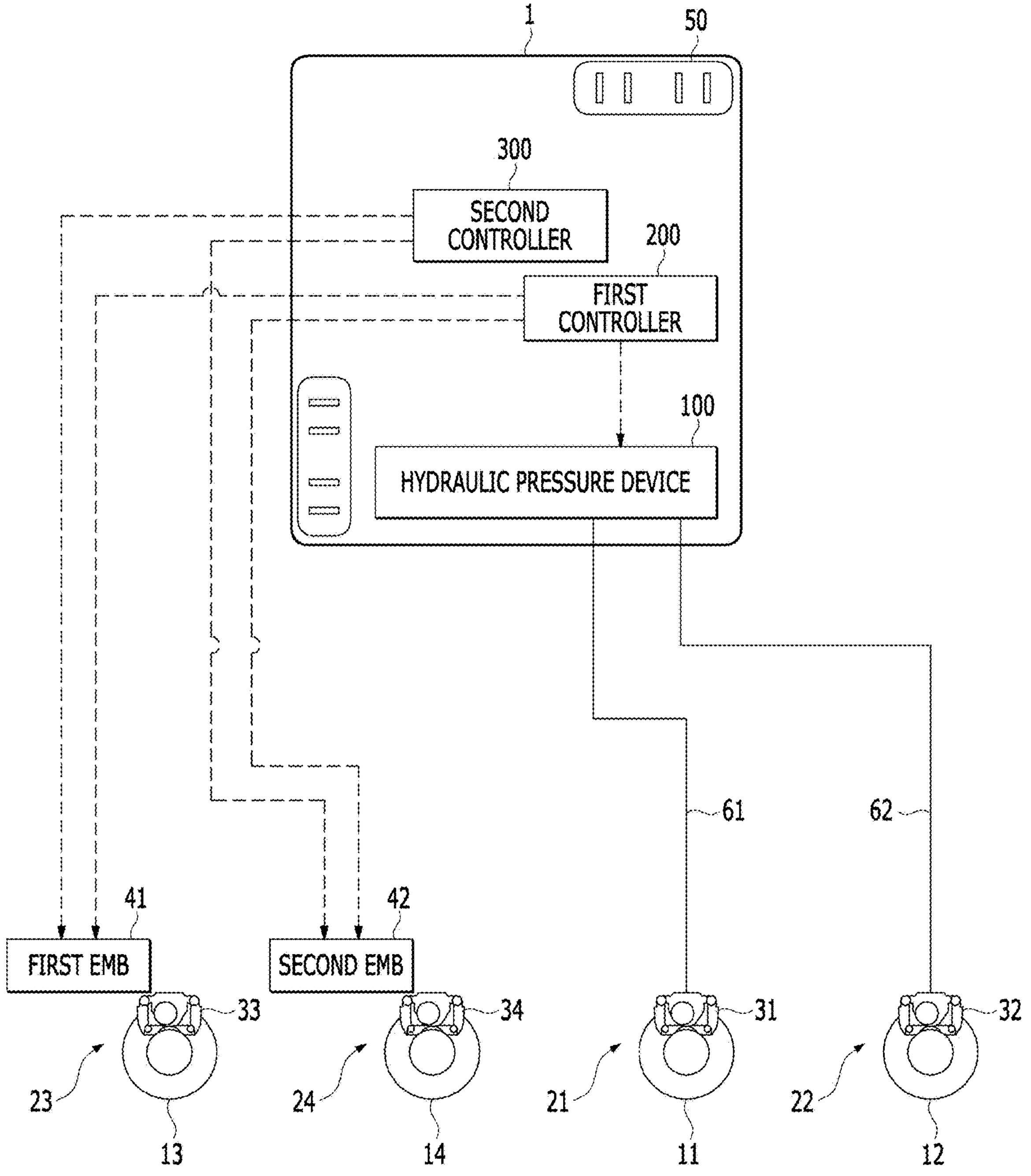
FIG. 2 is a view illustrating hydraulic control and electrical control of the brake system according to the first embodiment.

FIG. 1 is a view illustrating a brake system included in a vehicle according to a first embodiment, and FIG. 2 is a view illustrating hydraulic control and electrical control of the brake system according to the first embodiment.

As illustrated in FIG. 1, first wheel speed sensors 71, 72, 73, and 74 and second wheel speed sensors 81, 82, 83, and 84 may be respectively installed in wheels 11, 12, 13, and 14 in a dualized manner. The first wheel speed sensors 71, 72, 73, and 74 and the second wheel speed sensors 81, 82, 83, and 84 may output first wheel speed signals and second wheel speed signals, which indicate rotational speeds of the wheels 11, 12, 13, and 14, and transmit the first wheel speed signals and the second wheel speed signals to a first controller 200 and a second controller 300.

The second wheel speed sensors 83 and 84, which are respectively installed in the rear wheels 13 and 14, may be connected to the second controller 300 through an actuator housing of a first EMB 41 and an actuator housing of a second EMB 42. In this case, the second wheel speed sensors 83 and 84, which are respectively installed in the rear wheels 13 and 14, are integrated with a connection line of the first EMB 41 and a connection line of the second EMB 42 without requiring a separate line, thereby having simplified connection structures.

A hydraulic pressure supply device 130 may provide hydraulic pressure to the front wheels 11 and 12. The front wheels 11 and 12 may be configured by an electrohydraulic brake operated by hydraulic pressure.

The electromechanical brakes 41 and 42 (hereinafter, referred to as 'EMBs') are provided in the rear wheels 13 and 14 and operated by electromechanical force without hydraulic pressure.

The first controller 200 may control the hydraulic pressure supply device 130 and the EMBs 41 and 42 based on the first wheel speed signals outputted from the first wheel speed sensors 71, 72, 73, and 74. Particularly, the first controller 200 may perform braking control on the electrohydraulic brakes respectively installed in the front wheels 11 and 12 and the EMBs 41 and 42 respectively installed in the rear wheels 13 and 14 based on the first front wheel speed signals outputted from the first wheel speed sensors 71 and 72 of the front wheel. As described above, the first controller 200 may perform the braking control preferentially in consideration of the first front wheel speed signals.

When a failure of at least any one of the first wheel speed sensors 71 and 72 installed in the front wheels is identified, the first controller 200 may perform the braking control on the electrohydraulic brakes respectively installed in the front wheels 11 and 12 and the EMBs 41 and 42 respectively installed in the rear wheels 13 and 14 based on the first rear wheel speed signals outputted from the first wheel speed sensors 73 and 74 installed in the rear wheels.

The second controller 300 may control the hydraulic pressure supply device 130 and the EMBs 41 and 42 based on the second wheel speed signals outputted from the second wheel speed sensors 81, 82, 83, and 84. Particularly, the second controller 300 may perform the braking control on the electrohydraulic brakes respectively installed in the front wheels 11 and 12 and the EMBs 41 and 42 respectively installed in the rear wheels 13 and 14 based on the second rear wheel speed signals outputted from the second wheel speed sensors 83 and 84 of the rear wheels. As described above, the second controller 300 may perform the braking control preferentially in consideration of the second rear wheel speed signals.

In the description of the present disclosure, the configuration in which failures of the first wheel speed sensors 71 and 72 installed in the front wheels are identified includes a configuration in which a failure of at least any one of the first wheel speed sensors 71 and 72 installed in the front wheels is identified.

Likewise, the configuration in which failures of the second wheel speed sensors 83 and 84 installed in the rear wheels are identified includes a configuration in which a failure of at least any one of the second wheel speed sensors 83 and 84 installed in the rear wheels is identified.

When a failure of at least any one of the second wheel speed sensors 83 and 84 installed in the rear wheels is identified, the second controller 200 may perform the braking control on the electrohydraulic brakes respectively installed in the front wheels 11 and 12 and the EMBs 41 and 42 installed in the rear wheels 13 and 14 based on the second front wheel speed signals outputted from the second wheel speed sensors 81 and 82 installed in the front wheels.

In case that both the two controllers have no abnormality, the first controller 200 may preferentially perform the braking control. If the first controller 200 fails, the second controller 300 may be configured to perform the braking control instead of the first controller 200.

To this end, the first controller 200 and the second controller 300 may be connected by a first internal network PN1 and transmit and receive signals for identifying states thereof.

In addition, the first controller 200 and the second controller 300 may be connected by the second internal network PN2 and transmit and receive signals for identifying states thereof.

As described above, the first controller 200 and the second controller 300 are connected by the dualized internal networks PN1 and PN2, such that the states of the first controller 200 and the second controller 300 may be monitored by a normal internal network even though any one internal network fails.

As illustrated in FIG. 2, brake discs, which are configured to rotate together with the wheels 11, 12, 13, and 14, are respectively provided in the wheels 11, 12, 13, and 14, and brake calipers 21, 22, 23, and 24 are provided to stop the rotations of the wheels 11, 12, 13, and 14. For example, the brake calipers 21, 22, 23, and 24 may each include a pair of brake pads provided at two opposite sides of the brake disc and configured to press the brake against the disc.

The brake calipers 21 and 22 of the front wheels include wheel cylinders 31 and 32 configured to accommodate hydraulic pressure and allow the pair of brake pads to press the brake discs. For example, the wheel cylinders 31 and 32 may include a first wheel cylinder 31 installed in the first brake caliper 21, and a second wheel cylinder 32 installed in the second brake caliper 22.

The brake calipers 23 and 24 of the rear wheels may have the EMBs 41 and 42. The first EMB 41 may be provided in the third brake caliper 23, and the second EMB 42 may be provided in the fourth brake caliper 24.

The EMBs 41 and 42 may each have a means capable of moving the brake pad by electromechanical force without hydraulic pressure. For example, the EMBs 41 and 42 may each include the motor having the rotary shaft, and the spindle configured to be reciprocated by the rotation of the rotary shaft. The spindle may reciprocate the brake pad by the rotation of the rotary shaft.

The EMBs 41 and 42 may each press the brake pad toward the brake disc in response to an engagement signal. In addition, the EMBs 41 and 42 may each move the brake pad from the brake disc in response to a disengagement signal.

A brake system 1 includes a hydraulic pressure device 100 configured to generate hydraulic pressure for braking the vehicle, and the first and second controllers 200 and 300 configured to control an operation of the hydraulic pressure device 100.

The hydraulic pressure device 100 may generate the hydraulic pressure for generating the braking forces for the front wheels 11 and 12. For example, the hydraulic pressure device 100 may detect a driver's braking intention by means of a brake pedal 50. The hydraulic pressure device 100 may generate hydraulic pressure based on a movement distance and/or a movement speed of the brake pedal 50 and provide the generated hydraulic pressure to the wheel cylinders 31 and 32 of the front wheels through transmission flow paths 61 and 62. The transmission flow paths 61 and 62 may include a first transmission flow path 61 connected to the first wheel cylinder 31, and a second transmission flow path 62 connected to the second wheel cylinder 32.

The internal pressure of the wheel cylinders 31 and 32 of the front wheels may depend on the hydraulic pressure provided by the hydraulic pressure device 100. The braking forces may be applied to the front wheels 11 and 12 depending on the internal pressure of the wheel cylinders 31 and 32 of the front wheels.

The first controller 200 and the second controller 300 may control the operation of the hydraulic pressure device 100. For example, the first controller 200 and the second controller 300 may control the hydraulic pressure supply device 100 to generate the hydraulic pressure based on an output of a pedal travel sensor PTS.

The first controller 200 and the second controller 300 may control the first EMB 41 and the second EMB 42. The first controller 200 and the second controller 300 may provide engagement signals to the EMBs 41 and 42 to engage the EMBs in response to a braking instruction or provide disengagement signals to the EMBs 41 and 42 to disengage the EMBs in response to a braking release instruction.

The first controller 200 and the second controller 300 may include a plurality of semiconductor elements and be called various terms such as an electronic control unit (ECU). For example, the first controller 200 and the second controller 300 may include a plurality of processors and/or a plurality of memories.

Figure 3:
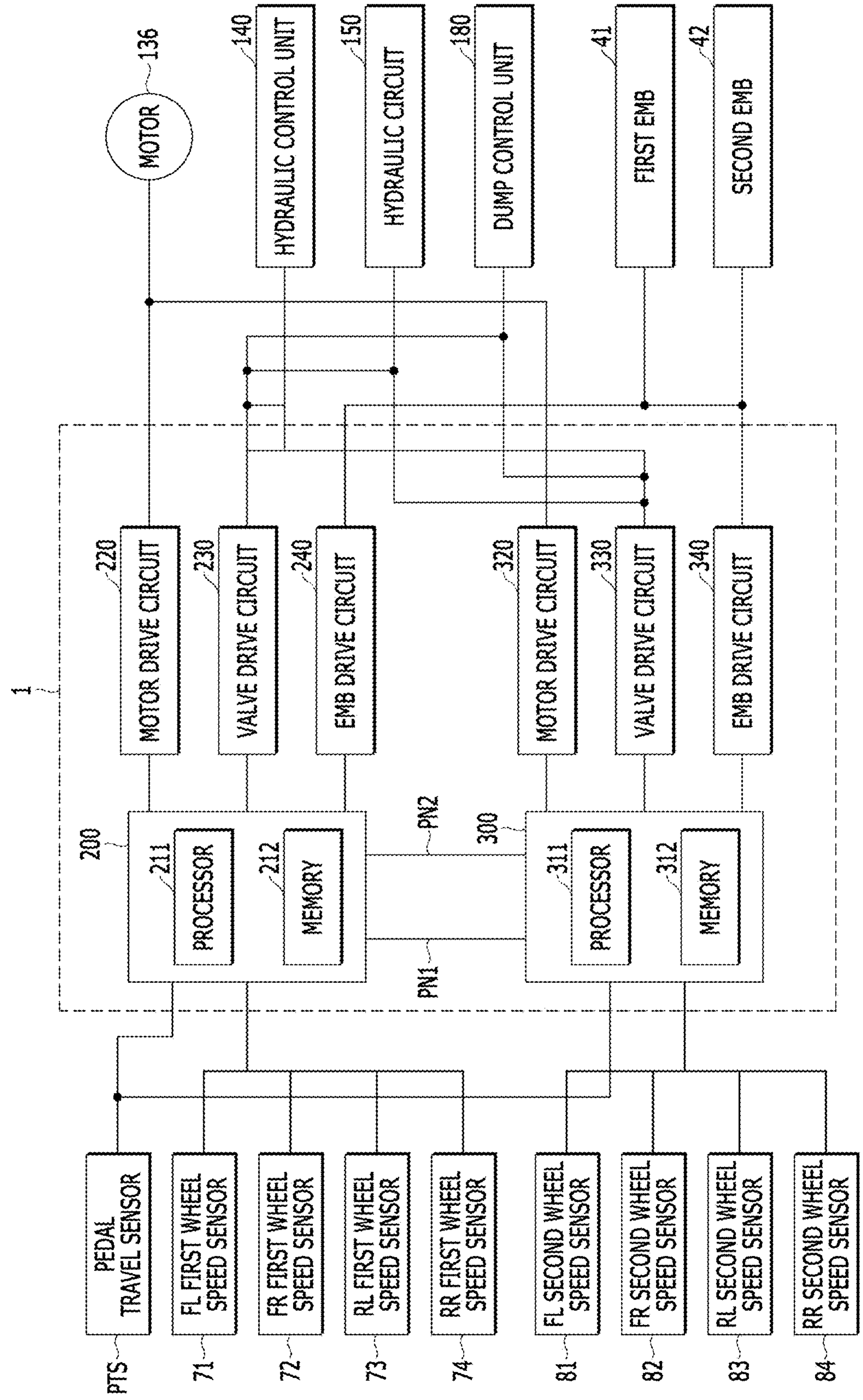
FIG. 3 is a view illustrating a control configuration of the brake system according to the first embodiment.

FIG. 3 is a view illustrating a control configuration of the brake system according to the first embodiment.

As illustrated in FIG. 3, the brake system 1 may include a motor 136, a hydraulic control device 140, a hydraulic circuit 150, a dump control device 180, the first and second EMBs 41 and 42, the pedal travel sensor PTS, the first wheel speed sensors 71, 72, 73, and 74, the second wheel speed sensors 81, 82, 83, and 84, motor drive circuits 220 and 320, valve drive circuits 230 and 330, EMB drive circuits 240 and 340, the first internal network PN1, the second internal network PN2, the first controller 200, and the second controller 300. The first controller 200 may include a processor 211 and a memory 212. In addition, the second controller 300 may include a processor 311 and a memory 312. The above-mentioned components are not essential components of the brake system 1, and at least some of the above-mentioned components may be excluded.

The motor 136 may include a rotary shaft provided rotatably. The motor 136 may include a rotor connected to the rotary shaft, and a stator fixed to a housing. For example, the rotor may include permanent magnets having N-poles and S-poles alternately disposed along an outer surface thereof, and the stator may include a plurality of teeth disposed along the outer surface of the rotor, and a plurality of coils configured to surround the plurality of teeth, respectively.

The rotor may be rotated by a magnetic interaction with the stator, and the rotation of the rotor may be provided to the rotary shaft. The motor 136 may receive drive currents controlled by the motor drive circuits 220 and 320. The plurality of coils included in the stator may form a magnetic field rotated at the periphery of the rotor by the drive current, and the rotor may be rotated by a magnetic interaction between the magnetic field of the rotor and the magnetic field of the stator.

The hydraulic control device 140, the hydraulic circuit 150, and the dump control device 180 may control flow paths extending from a master cylinder 120 or the hydraulic pressure supply device 130 to the wheel cylinders 31 and 32.

The hydraulic control device 140, the hydraulic circuit 150, and the dump control device 180 may receive drive currents controlled by the valve drive circuits 230 and 330.

The hydraulic control device 140, the hydraulic circuit 150, and the dump control device 180 may each include at least one solenoid valve configured to be opened or closed by the drive current. The solenoid valve may include a plunger configured to open or close the flow path, a spring configured to apply an elastic force to the plunger, and a coil configured to surround the plunger. The coil may form a magnetic field by the drive current, and the plunger may be moved against the elastic force of the spring by the magnetic field of the coil. Therefore, the solenoid valve may be opened or closed.

The EMBs 41 and 42 may each have a means capable of moving the brake pad by electromechanical force without hydraulic pressure. For example, the EMBs 41 and 42 may each include the motor having the rotary shaft, and the spindle configured to be reciprocated by the rotation of the rotary shaft. The spindle may reciprocate the brake pad by the rotation of the rotary shaft.

The motors respectively included in the EMBs 41 and 42 may receive drive currents controlled by the EMB drive circuits 240 and 340. The motor included in each of the EMBs 41 and 42 may press the brake pad toward the brake disc or move the brake pad away from the brake disc by the drive current.

The pedal travel sensor PTS may be installed in the vicinity of the brake pedal 50 and measure the movement of the brake pedal 50 made by the driver's braking intention. For example, the pedal travel sensor PTS may detect a movement distance and/or a movement speed of the brake pedal 50 from a reference position.

The pedal travel sensor PTS may be electrically connected to the processors 211 and 311 and provide the processors 211 and 311 with electrical signals (pedal travel signals) corresponding to the movement distance and/or the movement speed of the brake pedal 50. For example, the pedal travel sensor PTS may be connected directly to the processors 211 and 311 through hard wires or connected to the processors 211 and 311 through a communication network.

The motor position sensor (not illustrated) may measure a rotation angle of the rotor of the motor 136. For example, the motor position sensor may include a Hall sensor. The Hall sensors may detect periodic changes in magnetic fields caused by the rotations of the permanent magnets of the rotor. The motor position sensor may be connected directly to the processors 211 and 311 through hard wires or connected to the processors 211 and 311 through a communication network and provide the processors 211 and 311 with electrical signals (motor position signals) corresponding to the measured rotation angle.

A motor current sensor (not illustrated) may measure a drive current value supplied to the motor 136. For example, the motor current sensor may include a shunt resistor and a voltage distribution circuit and measure a drive current value supplied to the motor 136 by using the shunt resistor and the voltage distribution circuit. The motor current sensor may be connected directly to the processors 211 and 311 through hard wires or connected to the processors 211 and 311 through a communication network and provide the processors 211 and 311 with electrical signals (motor current signals) corresponding to the measured drive current value.

The motor drive circuits 220 and 320 may control the drive currents supplied to the motor 136 in response to the motor control signals of the processors 211 and 311. For example, the motor drive circuits 220 and 320 may each include a three-phase inverter including a plurality of switching elements configured to control drive currents supplied to the motor 136, and an inverter driver configured to control the switching elements included in the three-phase inverter in response to the motor control signals of the processors 211 and 311. The inverter driver may provide the switching elements of the three-phase inverter with the motor driving signal for operating the three-phase inverter in response to the motor control signals of the processors 211 and 311. The three-phase inverter may convert direct current power, which is supplied from a battery of the vehicle, into alternating current power in response to a motor driving signal of the inverter driver and provide the converted alternating current power to the motor 136.

The valve drive circuits 230 and 330 may control drive currents supplied to valves included in the hydraulic control device 140, the hydraulic circuit 150, and the dump control device 180 in response to the valve control signals of the processors 211 and 311. For example, the valve drive circuits 230 and 330 may each include a switching element configured to control drive currents supplied to the valves, and a switching driver configured to control the switching element in response to the valve control signals of the processors 211 and 311.

The EMB drive circuits 240 and 340 may control drive currents supplied to the motors included in the EMBs 41 and 42 in response to EMB control signals (EMB engagement signals and EMB disengagement signals) of the processors 211 and 311. For example, the EMB drive circuits 240 and 340 may each include an H-bridge circuit including a plurality of switching elements configured to control drive currents supplied to the EMB motors, and an H-bridge driver configured to control the switch elements included in the H-bridge circuit in response to the EMB control signals of the processors 211 and 311.

The processors 211 and 311 may provide control signals for controlling the operations of the components included in the brake system 1 in accordance with the driver's braking intention.

Meanwhile, the first controller 200 and the second controller 300 may include the memories 212 and 312 configured to store or memorize programs and data for implementing the operation of controlling the components included in the brake system 1.

The memories 212 and 312 may provide the stored programs and data to the processors 211 and 311 and memorize temporary data generated during the operations of the processors 211 and 311. For example, the memories 212 and 312 may include volatile memories, such as a static random access memory (S-RAM) and a dynamic random access memory (D-RAM), and non-volatile memories, such as a read-only memory (ROM), an erasable programmable read-only memory (EPROM), and a flash memory.

The processors 211 and 311 may be electrically connected to the pedal travel sensor PTS, first pressure sensors PS1 and PS2, a motor position sensor, a motor current sensor, the motor drive circuit 220, the valve drive circuit 230, and the EMB drive circuit 240.

The processors 211 and 311 may process electrical signals received from the pedal travel sensor PTS, the first pressure sensors PS1 and PS2, the motor position sensor, and the motor current sensor and provide motor control signals, valve control signals, and EMB control signals to the motor drive circuits 220 and 320, the valve drive circuits 230 and 330, and the EMB drive circuits 240 and 340 based on the processed electrical signals.

For example, the processors 211 and 311 may determine target hydraulic pressure to be provided to the wheel cylinders 31 and 32 of the front wheels based on the pedal travel signal of the pedal travel sensor PTS and provide the motor control signals to the motor drive circuits 220 and 320 to move a hydraulic pressure piston 132 in response to the target pressure. In addition, the processors 211 and 311 may determine measured pressure based on a first pressure signal of the first pressure sensor PS1 and provide the motor control signals to the motor drive circuits 220 and 320 to move the hydraulic pressure piston 132 based on a difference between the measured pressure and the target pressure.

In various embodiments, the processors 211 and 311 may provide the motor control signals to the motor drive circuits 220 and 320 to move the hydraulic pressure piston 123 forward and provide the valve control signals to the valve drive circuits 230 and 330 to define flow paths extending from a first pressure chamber 133 to the wheel cylinders 31 and 32 of the front wheels. In addition, the processors 211 and 311 may provide the motor control signals to the motor drive circuits 220 and 320 to move the hydraulic pressure piston 123 rearward and provide the valve control signals to the valve drive circuits 230 and 330 to define flow paths extending from a second pressure chamber 134 to the wheel cylinders 31 and 32.

Figure 4:
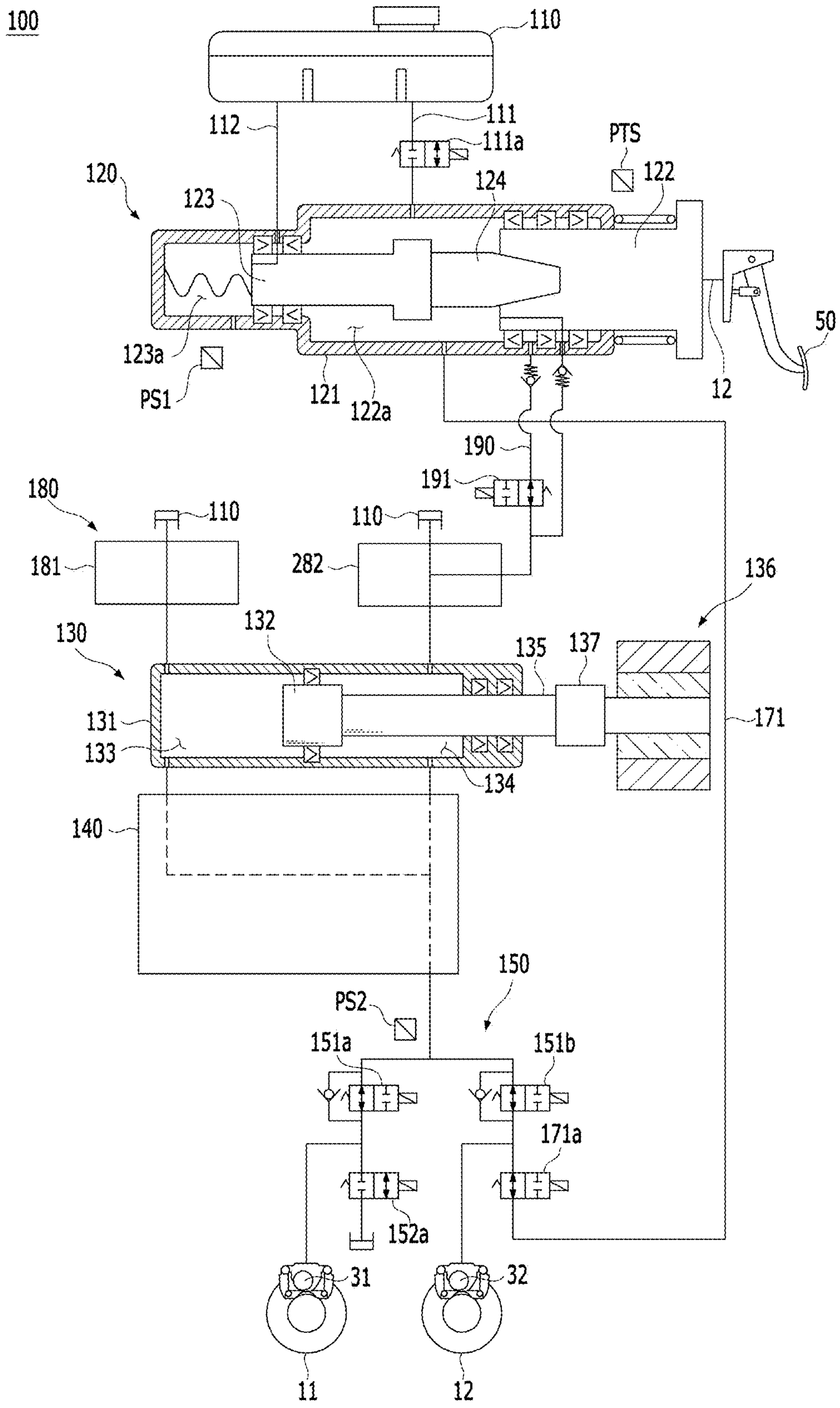
FIG. 4 is a view illustrating a hydraulic structure of the hydraulic pressure device included in the brake system according to the first embodiment.

FIG. 4 is a view illustrating a hydraulic structure of the hydraulic pressure device included in the brake system according to the first embodiment.

As illustrated in FIG. 4, the hydraulic pressure device 100 may include a reservoir 110 configured to store a pressure medium, the master cylinder 120 configured to provide the driver with a reaction force made by a pedal effort of the brake pedal 50 and pressurize and discharge the pressure medium such as brake oil accommodated therein, the hydraulic pressure supply device 130 configured to generate hydraulic pressure of the pressure medium by means of a mechanical operation by receiving the driver's braking intention as an electrical signal from the pedal travel sensor PTS configured to detect the travel of the brake pedal 50, the hydraulic control device 140 configured to control the hydraulic pressure provided from the hydraulic pressure supply device 130, the hydraulic circuit 150 having the wheel cylinders 31 and 32 configured to brake the front wheels 11 and 12 by receiving the hydraulic pressure of the pressure medium, a back-up flow path 171 configured to hydraulically connect the master cylinder 120 and the hydraulic circuit 150, the dump control device 180 provided between the hydraulic pressure supply device 130 and the reservoir 110 and configured to control a flow of the pressure medium, and an inspection flow path 190 connected to a master chamber of the master cylinder 120.

The reservoir 110, the master cylinder 120, the hydraulic pressure supply device 130, the hydraulic control device 140, the hydraulic circuit 150, the back-up flow path 171, the dump control device 180, reservoir flow paths 111 and 112, and the inspection flow path 190 are not essential components of the hydraulic pressure device 100, and at least some of the above-mentioned components may be excluded.

In case that the driver applies a pedal effort to the brake pedal 50 to perform the braking operation, the master cylinder 120 may provide stable pedal feel by providing the driver with a reaction force related to the pedal effort. In addition, the master cylinder 120 may be configured to pressurize and discharge the pressure medium accommodated therein by the operation of the brake pedal 50.

The master cylinder 120 may include a cylinder body 121 configured to define a chamber therein, a first master chamber 122*a* formed at an inlet side of the cylinder body 121 to which the brake pedal 50 is connected, a first master piston 122 provided in the first master chamber 122*a*, connected to the brake pedal 50, and configured to be displaced by the operation of the brake pedal 50, a second master chamber 123*a* formed on the cylinder body 121 and formed inward or forward (leftward based on FIG. 4) of the first master chamber 122*a*, a second master piston 123 provided in the second master chamber 123*a* and configured to be displaced by the travel of the first master piston 122 or the hydraulic pressure of the pressure medium accommodated in the first master chamber 122*a*, and a pedal simulator 124 disposed between the first master piston 122 and the second master piston 123 and configured to provide pedal feel by means of an elastic restoring force dented by compression.

The cylinder body 121, the first master chamber 122*a*, the first master piston 122, the second master chamber 123*a*, the second master piston 123, and the pedal simulator 124 are not essential components of the master cylinder 120, and at least some of the above-mentioned components may be excluded.

The first master piston 122 and the second master piston 123 may be respectively provided in the first master chamber 122*a* and the second master chamber 123*a* and form hydraulic pressure or negative pressure in the pressure medium accommodated in the chambers while moving forward and rearward.

The pedal simulator 124 may be provided between the first master piston 122 and the second master piston 123 and provide the pedal feel of the brake pedal 50 to the driver by the elastic restoring force thereof.

The reservoir 110 may accommodate and store the pressure medium therein. The reservoir 110 may be connected to component elements, such as the master cylinder 120, the hydraulic pressure supply device 130, and the hydraulic circuit to be described below, and supply or receive the pressure medium.

The reservoir flow paths 111 and 112 may be provided between the reservoir 110 and the master cylinder 120 and hydraulically connect the reservoir 110 and the master cylinder 120. The reservoir flow paths 111 and 112 may include a first reservoir flow path 111 configured to connect the first master chamber 122*a* of the master cylinder 120 and the reservoir 110, and a second reservoir flow path 112 configured to connect the second master chamber 123*a* of the master cylinder 120 and the reservoir 110. A simulator valve 112*a* may be provided in the first reservoir flow path 111 and control the flow of the pressure medium between the reservoir 110 and the first master chamber 122*a* through the first reservoir flow path 111.

The hydraulic pressure supply device 130 may be configured to generate the hydraulic pressure of the pressure medium by the mechanical operation by receiving the driver's braking intention as an electrical signal from the pedal travel sensor PTS configured to detect the travel of the brake pedal 50.

The hydraulic pressure supply device 130 may include a cylinder block 131 configured to accommodate the pressure medium, a hydraulic piston 132 accommodated in the cylinder block 131, the pressure chambers 133 and 134 separated by the hydraulic piston 132 and the cylinder block 131, the motor 136 configured to generate a rotational force, a power conversion device 137 configured to convert the rotational force of the motor 136 into a translational movement of the hydraulic pressure piston 132, and a driving shaft 135 configured to transmit power to the hydraulic piston 132.

The cylinder block 131, the hydraulic piston 132, the pressure chambers 133 and 134, the motor 136, the power conversion device 137, and the driving shaft 135 are not essential components of the hydraulic pressure supply device 130, and at least some of the above-mentioned components may be excluded.

The pressure chambers 133 and 134 may include the first pressure chamber 133 positioned forward of the hydraulic piston 132 (leftward of the hydraulic piston 132 based on FIG. 4), and the second pressure chamber 134 positioned rearward of the hydraulic piston 132 (rightward of the hydraulic piston 132 based on FIG. 4). That is, the first pressure chamber 133 may be provided and defined by the cylinder block 131 and a front surface of the hydraulic piston 132, and a volume of the first pressure chamber 133 may change as the hydraulic piston 132 moves. In addition, the second pressure chamber 134 may be provided and defined by the cylinder block 131 and a rear surface of the hydraulic piston 132, and a volume of the second pressure chamber 134 may change as the hydraulic piston 132 moves.

When the pedal travel sensor PTS detects the travel of the brake pedal 50, the hydraulic piston 132 may generate the hydraulic pressure in the first pressure chamber 133 and generate the negative pressure in the second pressure chamber 134 while moving forward in the cylinder block 131.

On the contrary, when the pedal effort of the brake pedal 50 is eliminated, the hydraulic piston 132 may generate the negative pressure in the first pressure chamber 133 and generate the hydraulic pressure in the second pressure chamber 134 while moving rearward in the cylinder block 131.

As described above, the hydraulic pressure or the negative pressure may be generated in the first pressure chamber 133 and the second pressure chamber 134 by the motor 1136 of the hydraulic pressure supply device 130.

The hydraulic pressure supply device 130 may be hydraulically connected to the reservoir 110 by the dump control device 180. The dump control device 180 may include at least one flow path and at least one valve to control the flow of the pressure medium between the hydraulic pressure supply device 130 and the reservoir 110.

The hydraulic control device 140 may be configured to control hydraulic pressure transmitted to the wheel cylinders 31, 32, 33, and 34.

The hydraulic control device 140 is divided into the hydraulic circuit 150 configured to control the flow of the hydraulic pressure transmitted to the first wheel cylinders 31 and 32 among the four wheel cylinders 31, 32, 33, and 34, and a second hydraulic circuit 160 configured to control the flow of the hydraulic pressure transmitted to the third and fourth wheel cylinders 33 and 34. The hydraulic control device 140 may include at least one flow path and at least one valve to guide the hydraulic pressure, which is transmitted from the hydraulic pressure supply device 130 to the wheel cylinder 30, to the hydraulic circuit 150 and the second hydraulic circuit 160.

The hydraulic control device 140 may define a flow path for supplying the pressure medium to the hydraulic circuit 150 and the second hydraulic circuit 160 by using the pressure in the first pressure chamber 133 generated by the forward movement of the hydraulic piston 132. For example, as illustrated in FIG. 4, the hydraulic control device 140 may define a flow path configured to connect the first pressure chamber 133 and the hydraulic circuit 150. The pressure medium in the first pressure chamber 133 may be provided to the hydraulic circuit 150 through the hydraulic control device 140.

The hydraulic control device 140 may define a flow path for providing the pressure medium to the hydraulic circuit 150 and the second hydraulic circuit 160 by using the pressure in the second pressure chamber 134 generated by the rearward movement of the hydraulic piston 132. For example, as illustrated in FIG. 4, the hydraulic control device 140 may define a flow path configured to connect the second pressure chamber 134 and the hydraulic circuit 150. The pressure medium in the second pressure chamber 134 may be provided to the hydraulic circuit 150 through the hydraulic control device 140.

The hydraulic control device 140 may define a flow path for restoring the pressure medium from the hydraulic circuit 150 and the second hydraulic circuit 160 by using the negative pressure in the first pressure chamber 133 generated by the rearward movement of the hydraulic piston 132. For example, as illustrated in FIG. 4, the hydraulic control device 140 may define a flow path configured to connect the first pressure chamber 133 and the hydraulic circuit 150. The pressure medium in the hydraulic circuit 150 may be provided to the first pressure chamber 133 by the hydraulic control device 140.

The hydraulic control device 140 may define a flow path for restoring the pressure medium from the hydraulic circuit 150 and the second hydraulic circuit 160 by using the negative pressure in the second pressure chamber 134 generated by the forward movement of the hydraulic piston 132. For example, as illustrated in FIG. 4, the hydraulic control device 140 may define a flow path configured to connect the second pressure chamber 134 and the hydraulic circuit 150. The pressure medium in the hydraulic circuit 150 may be provided to the second pressure chamber 134 by the hydraulic control device 140.

The hydraulic circuit 150 may adjust and control the hydraulic pressure applied to the first wheel cylinders 31 and 22, and the second hydraulic circuit 160 may adjust and control the hydraulic pressure applied to the third and fourth wheel cylinders 33 and 24.

The hydraulic circuit 150 may have first to fourth inlet valves 151*a*, 151*b*, 161*a*, and 161*b* to control the flow of the pressure medium and the hydraulic pressure transmitted to the first to fourth wheel cylinders 31, 32, 33, and 34. The first to fourth inlet valves 151*a*, 151*b*, 161*a*, and 161*b* may be respectively disposed at upstream sides of the first to fourth wheel cylinders 31, 32, 33, and 34 and each be provided as a normal open type solenoid valve.

The hydraulic circuit 150 may include a third outlet valve 152*a* configured to control a flow of the pressure medium discharged from the first wheel cylinder 31 to improve performance when the first wheel cylinder 31 performs a braking release operation. The third outlet valve 152*a* may be disposed at a discharge side of the first wheel cylinder 31 and control a flow of the pressure medium transmitted to the reservoir 110 from the first wheel cylinder 31. The third outlet valve 152*a* may be provided as a normal closed type solenoid valve.

The second wheel cylinder 32 of the hydraulic circuit 150 may be connected to the back-up flow path 171, and a first cut valve 171*a* may be provided in the back-up flow path 171 and control a flow of the pressure medium between the second wheel cylinder 32 and the master cylinder 120.

The brake system 1 may include the back-up flow path 171 to implement the braking by supplying the pressure medium, which is discharged from the master cylinder 120, directly to the wheel cylinders 31 and 32 of the front wheels in case that a normal operation cannot be performed because of a breakdown of devices or the like. A mode in which the hydraulic pressure of the master cylinder 120 is transmitted directly to the wheel cylinders 31 and 32 of the front wheels is referred to as an abnormal operating mode, i.e., a fall-back mode.

The back-up flow path 171 may be configured to connect the first master chamber 122*a* of the master cylinder 120 and the hydraulic circuit 150.

At least one first cut valve 171*a* may be provided in the back-up flow path 171 and control a bidirectional flow of the pressure medium. The first cut valve 171*a* may be provided as a normal open type solenoid valve.

In case that the first cut valve 171*a* is closed, the pressure medium in the master cylinder 120 may be prevented from being transmitted directly to the wheel cylinders 31 and 32 of the front wheels, and the hydraulic pressure provided from the hydraulic pressure supply device 130 from leaking to the master cylinder 120. In addition, in case that the first cut valve 171*a* is opened, the pressure medium pressurized by the master cylinder 120 may be supplied directly to the hydraulic circuit 150 through the back-up flow path 171, such that the braking may be implemented.

The inspection flow path 190 may be provided to connect the master cylinder 120 and the dump control device 180 and provided to inspect whether the simulator valve 112*a* and various types of component elements mounted in the master cylinder 120 leak.

The hydraulic pressure device 100 may include the first pressure sensor PS1 configured to measure the hydraulic pressure provided by the master cylinder 120, and the second pressure sensor PS2 configured to measure the hydraulic pressure of the pressure medium provided by the hydraulic pressure supply device 130. The first pressure sensor PS1 and the second pressure sensor PS2 may output electrical signals indicating the pressure measured by the first and second controllers 200 and 300.

The hydraulic pressure device 100 illustrated in FIG. 4 may have the same structure as a first hydraulic pressure device 100*a* and a second hydraulic pressure device 100*b* described below in other embodiments. Therefore, in other embodiments, the description of the first hydraulic pressure device 100*a* and the second hydraulic pressure device 100*b* will be replaced with the description of the hydraulic pressure device 100 in FIG. 4.

As described above, the brake system 1 according to the first embodiment illustrated in FIGS. 1 to 4 may include the first wheel speed sensors 71, 72, 73, and 74 and the second wheel speed sensors 81, 82, 83, and 84 configured as redundancy in the wheels 11, 12, 13, and 14, the electrohydraulic brakes respectively installed in the front wheels, the EMBs 41 and 42 respectively installed in the rear wheels, the first controller 200 configured to perform braking control on the electrohydraulic brakes and the EMBs 41 and 42 based on the first front wheel speed signals or the first rear wheel speed signals outputted from the first wheel speed sensors 71, 72, 73, and 74 of the wheels, and the second controller 300 configured to perform braking control on the electrohydraulic brakes and the EMBs 41 and 42 based on the second rear wheel speed signals or the second front wheel speed signals outputted from the second wheel speed sensors 81, 82, 83, and 84 of the wheels in response to a failure of the first controller 200.

The first controller 200 and the second controller 300 may be connected to the first internal network PN1 and transmit and receive signals for identifying states thereof.

In addition, the first controller 200 and the second controller 300 may be connected by the second internal network PN2 and transmit and receive signals for identifying states thereof.

As described above, the first controller 200 and the second controller 300 are connected by the dualized internal networks PN1 and PN2, such that the states of the first controller 200 and the second controller 300 may be monitored by a normal internal network even though any one internal network fails.

The first internal network PN1 and the second internal network PN2 may each be configured as any one of a universal asynchronous receiver/transmitter (UART), Flexray, a controller area network (CAN), and a local interconnect network (LIN).

The first controller 200 may perform cooperative control together with another control system of the vehicle while the first controller 200 performs the braking control. For example, the first controller 200 may perform the cooperative control for regenerative braking based on the first front wheel speed signals. When a failure of at least any one of the first wheel speed sensors 71 and 72 is identified, the first controller 200 may perform the cooperative control for regenerative braking based on the first rear wheel speed signals outputted from the first wheel speed sensors 73 and 74 installed in the rear wheels.

The second controller 300 may perform cooperative control together with another control system of the vehicle while the second controller 300 performs the braking control.

For example, the second controller 300 may perform the cooperative control for regenerative braking based on the second rear wheel speed signals. When a failure of at least any one of the second wheel speed sensors 83 and 84 is identified, the second controller 200 may perform the cooperative control for regenerative braking based on the second front wheel speed signals outputted from the second wheel speed sensors 81 and 82 installed in the front wheels.

Figure 5:
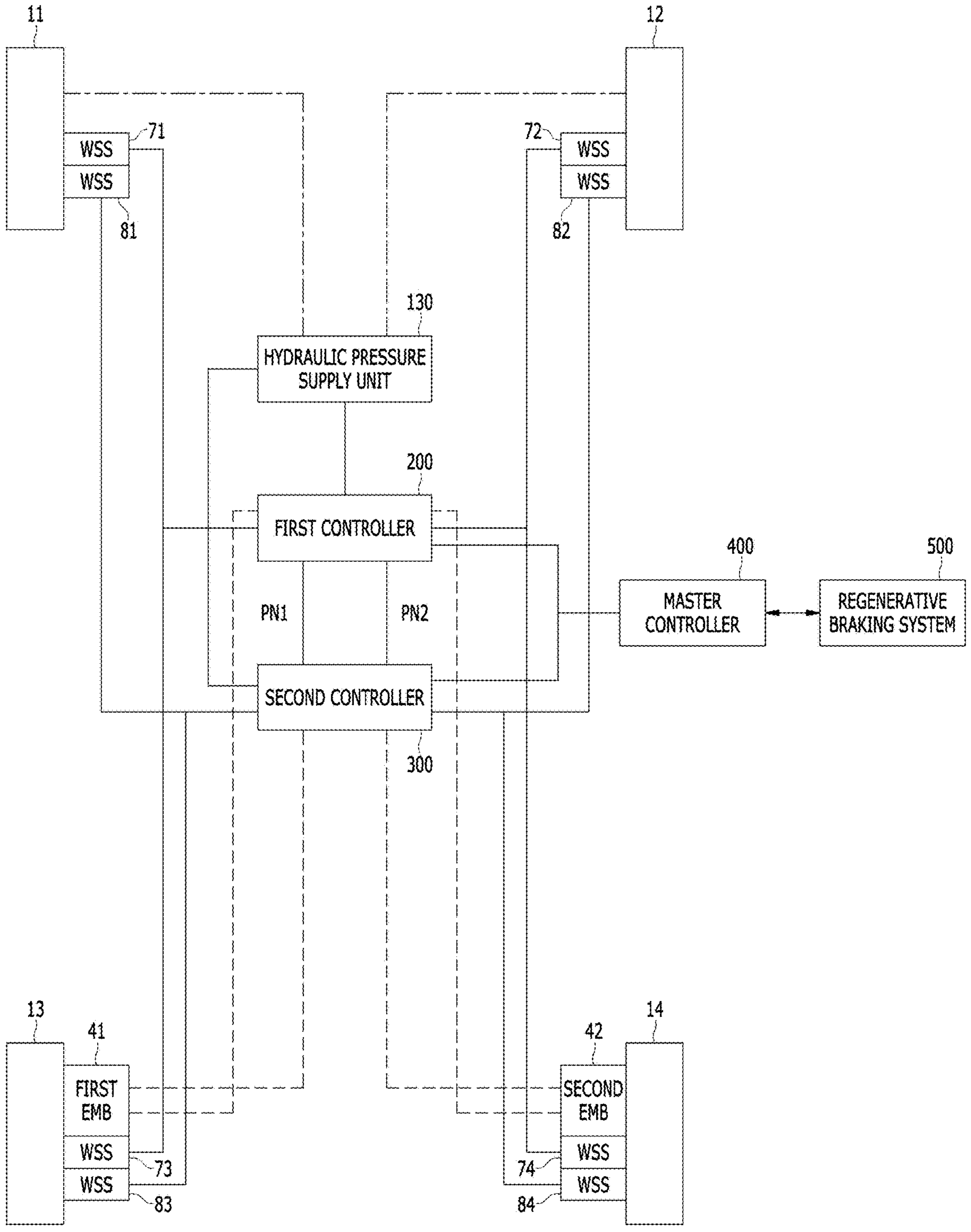
FIG. 5 is a view illustrating a brake system included in a vehicle according to a second embodiment.
Figure 6:
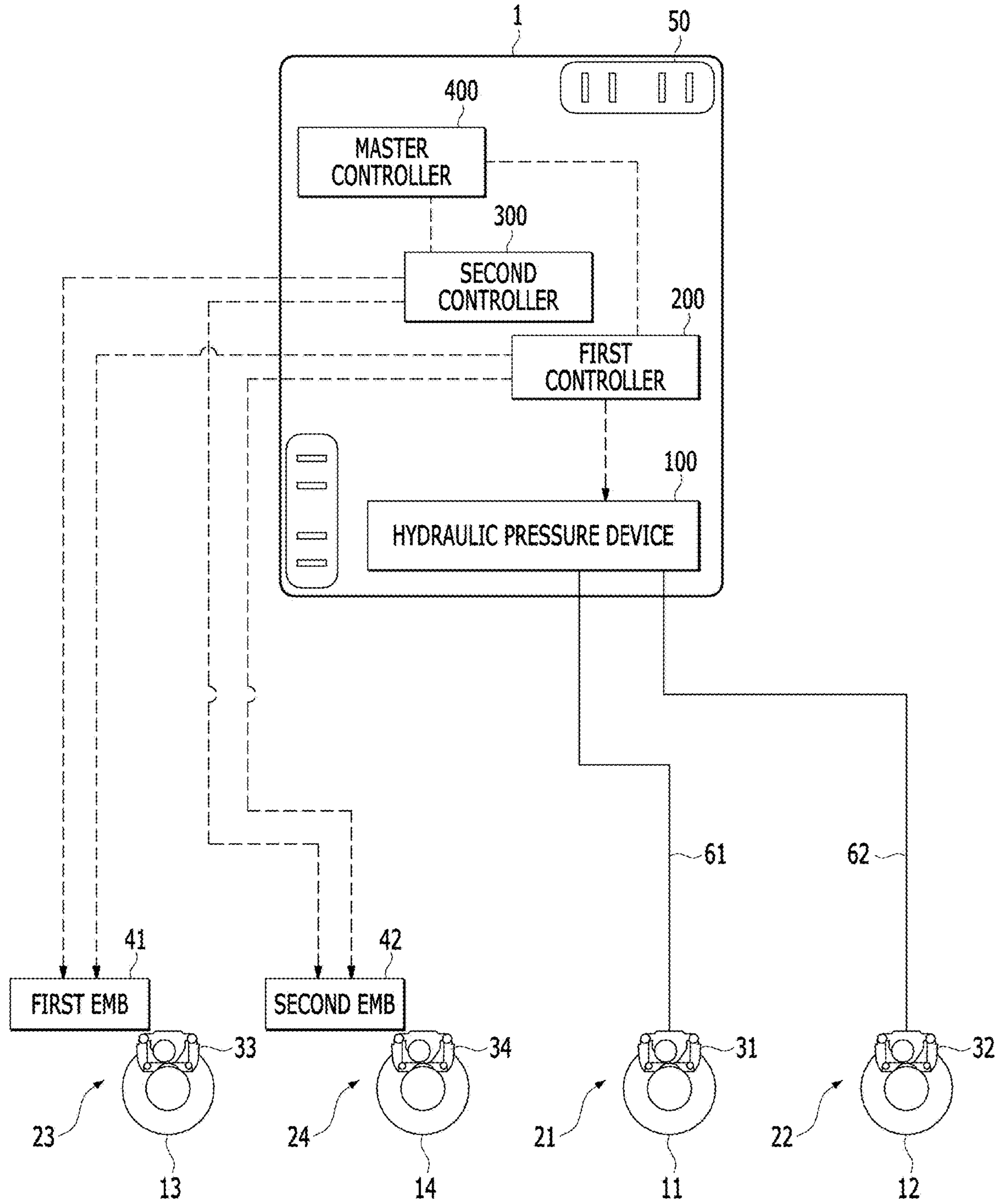
FIG. 6 is a view illustrating hydraulic control and electrical control of the brake system according to the second embodiment.
Figure 7:
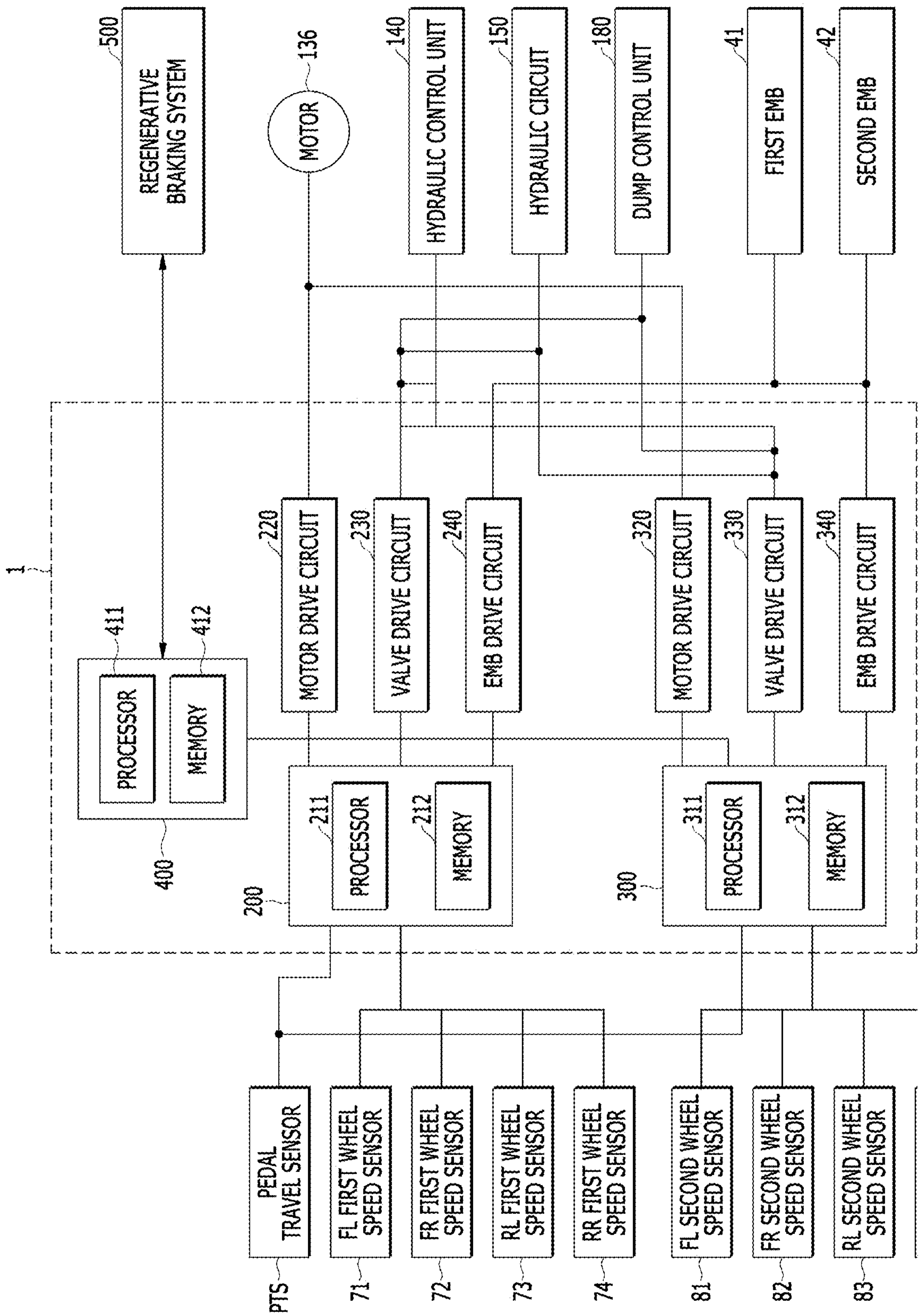
FIG. 7 is a view illustrating a control configuration of the brake system according to the second embodiment.

FIG. 5 is a view illustrating a brake system included in a vehicle according to a second embodiment, FIG. 6 is a view illustrating hydraulic control and electrical control of the brake system according to the second embodiment, and FIG. 7 is a view illustrating a control configuration of the brake system according to the second embodiment.

The brake system according to the second embodiment differs from the brake system according to the first embodiment in that the brake system according to the second embodiment further includes a master controller 400 connected to the first controller 200 and the second controller 300.

In order to avoid the repeated description, the description will focus on the master controller 400 added to the first embodiment.

The master controller 400 may be connected to the first controller 200 and the second controller 300 through a vehicle network. The master controller 400 may identify a state of the first controller 200 and a state of the second controller 300. In addition, the master controller 400 may impart a control authority for braking control to one of the first controller 200 and the second controller 300 that is in a normal state. For example, the master controller 400 may impart the control authority preferentially to the first controller 200 at ordinary times. When the master controller 400 identifies a failure of the first controller 200 while monitoring the state of the first controller 200 and the state of the second controller 300, the master controller 400 may impart the control authority for braking control to the second controller 300.

The master controller 400 may receive the first wheel speed signals and/or the second wheel speed signals from the first controller 200 and/or the second controller 300.

While the first controller 200 performs the braking control, the master controller 400 may receive the first front wheel speed signals from the first controller 200 and perform the cooperative control together with another control system of the vehicle based on the first front wheel speed signals. When a failure of at least any one of the first wheel speed sensors 71 and 72 installed in the front wheels is identified, the master controller 400 may perform the cooperative control together with another control system of the vehicle based on the first rear wheel speed signals received from the first controller 200. For example, the master controller 400 may perform cooperative control for regenerative braking together with a regenerative braking system 500 based on the first front wheel speed signals or the first rear wheel speed signals. In this case, torque made by the regenerative braking during the regenerative braking may be generated by the regenerative braking system 500, and the master controller 400 may control the first controller 200 to compensate for an insufficient braking force.

In addition, while the second controller 300 performs the braking control, the master controller 400 may receive the second wheel speed signals from the second controller 300 and perform the cooperative control together with another control system of the vehicle based on the second wheel speed signals. When a failure of at least any one of the second wheel speed sensors 83 and 84 installed in the rear wheels is identified, the master controller 400 may perform the cooperative control together with another control system of the vehicle based on the second front wheel speed signals received from the second controller 300. For example, the master controller 400 may perform the cooperative control for regenerative braking together with the regenerative braking system 500 based on the second rear wheel speed signals or the second front wheel speed signals. In this case, torque made by the regenerative braking during the regenerative braking may be generated by the regenerative braking system 500, and the master controller 400 may control the second controller 300 to compensate for an insufficient braking force.

Figure 8:
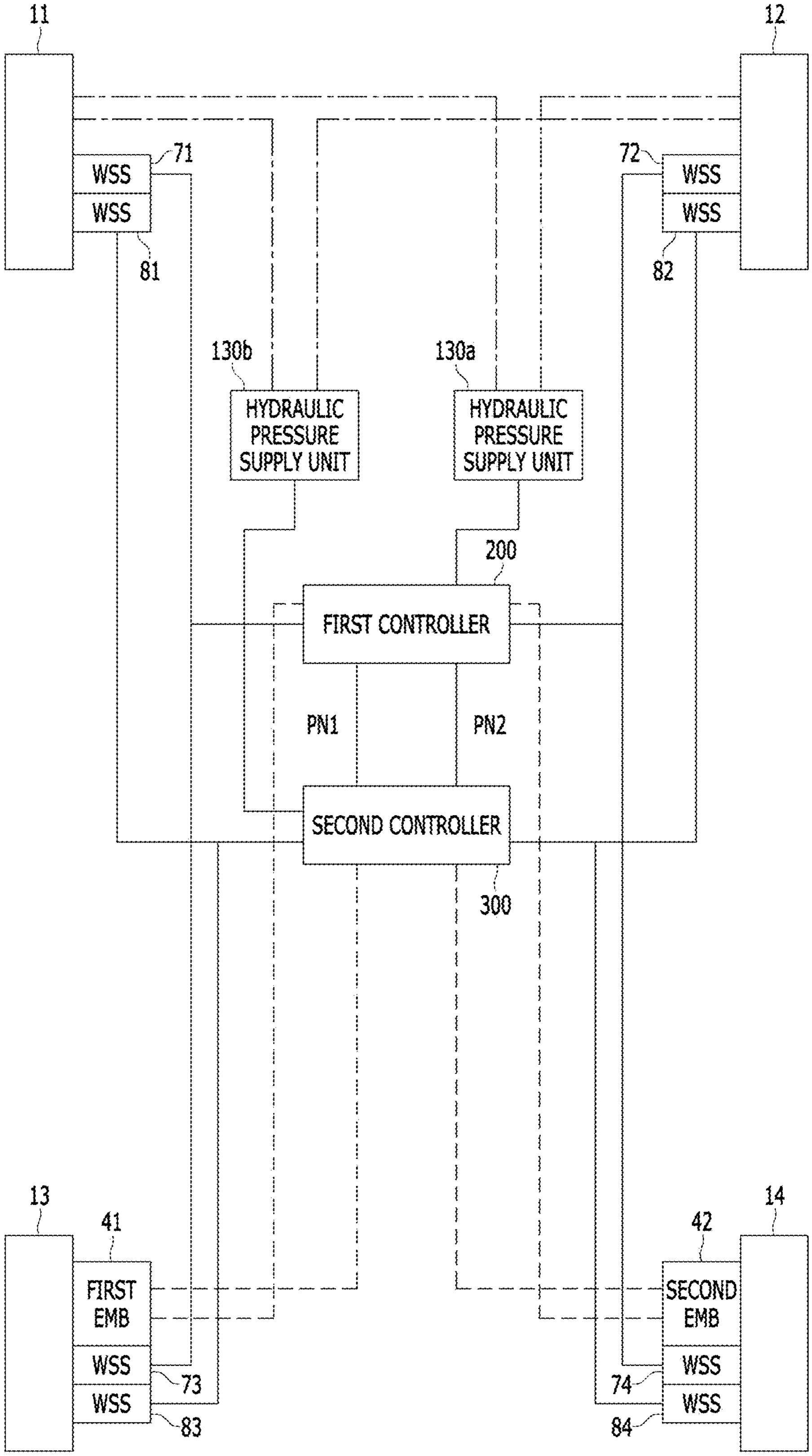
FIG. 8 is a view illustrating a brake system included in a vehicle according to a third embodiment.
Figure 9:
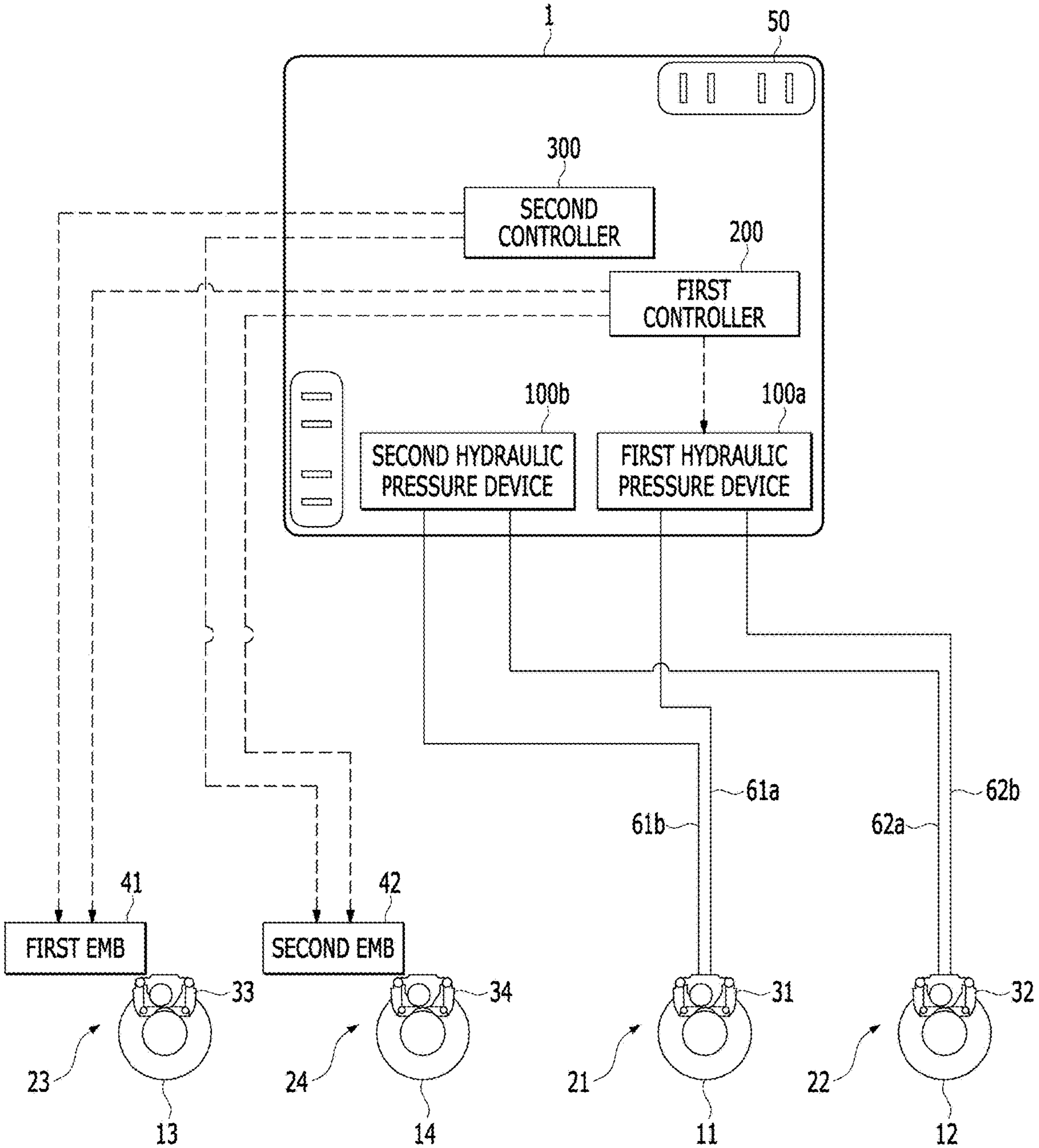
FIG. 9 is a view illustrating hydraulic control and electrical control of the brake system according to the third embodiment.
Figure 10:
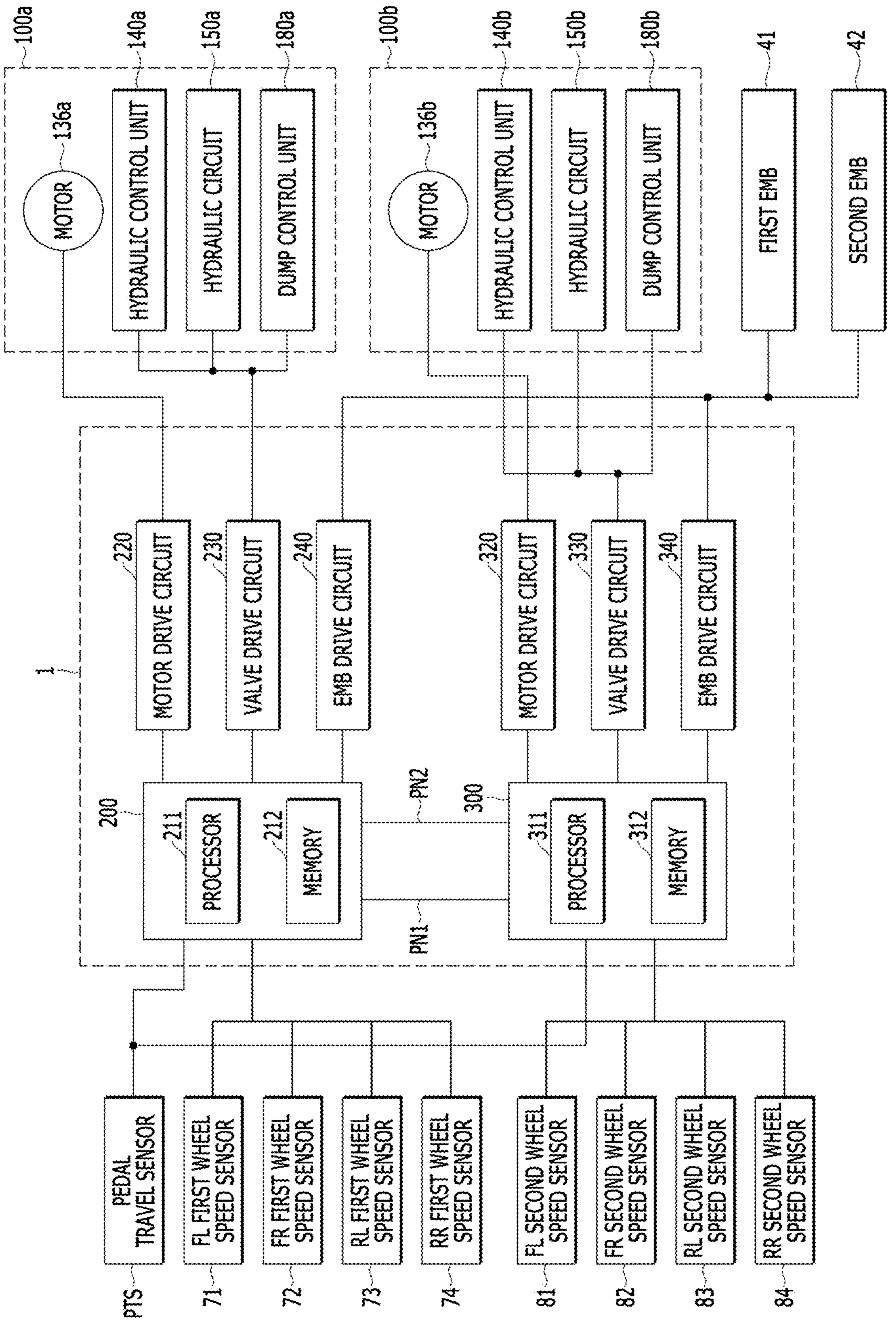
FIG. 10 is a view illustrating a control configuration of the brake system according to the third embodiment.

FIG. 8 is a view illustrating a brake system included in a vehicle according to a third embodiment, FIG. 9 is a view illustrating hydraulic control and electrical control of the brake system according to the third embodiment, and FIG. 10 is a view illustrating a control configuration of the brake system according to the third embodiment.

The brake system according to the third embodiment differs from the brake system according to the first embodiment in that the separate hydraulic pressure devices 100*a* and 100*b* connected to the first controller 200 and the second controller 300 are provided.

In order to avoid the repeated description, the description will focus on the separate hydraulic pressure devices 100*a* and 100*b* different from the hydraulic pressure device of the first embodiment.

As illustrated in FIG. 9, the first controller 200 may be connected to the first hydraulic pressure device 100*a* and perform control to supply the hydraulic pressure to the front wheels 11 and 12. The second controller 300 may be connected to the second hydraulic pressure device 100*b* and perform control to supply the hydraulic pressure to the front wheels 11 and 12.

Although not illustrated, the first controller 200 may configured to be additionally connected to the second hydraulic pressure device 100*b*, and the second controller 300 may be configured to be additionally connected to the first hydraulic pressure device 100*a*. In this case, the braking control may be normally performed on the front wheels even though any one of the hydraulic pressure devices is abnormal and any one of the two controllers is abnormal.

With reference to FIGS. 8 to 10, the first controller 200 may be connected to a first hydraulic pressure supply device 130*a* including a first motor 136*a*. Specifically, the first controller 200 may control the first motor 136*a* so that the first hydraulic pressure supply device 130*a* supplies the hydraulic pressure to the front wheels 11 and 12.

The second controller 300 may be connected to a second hydraulic pressure supply device 130*b* including a second motor 136*b*. Specifically, the second controller 300 may control the second motor 136*b* so that the second hydraulic pressure supply device 130*b* supplies the hydraulic pressure to the front wheels 11 and 12.

The motor current sensors (not illustrated) may measure drive current values supplied to the motors 136*a* and 136*b*. For example, the motor current sensors may each include a shunt resistor and a voltage distribution circuit and measure a drive current value supplied to the motor 136 by using the shunt resistor and the voltage distribution circuit. The motor current sensors may each be connected directly to the processors 211 and 311 through hard wires or connected to the processors 211 and 311 through a communication network and provide the processors 211 and 311 with electrical signals (motor current signals) corresponding to the measured drive current value.

The motor drive circuits 220 and 320 may control the drive currents supplied to the motors 136*a* and 136*b* in response to the motor control signals of the processors 211 and 311. For example, the motor drive circuits 220 and 320 may each include a three-phase inverter including a plurality of switching elements configured to control drive currents supplied to the motors 136*a* and 136*b*, and an inverter driver configured to control the switching elements included in the three-phase inverter in response to the motor control signals of the processors 211 and 311. The inverter driver may provide the switching elements of the three-phase inverter with the motor driving signal for operating the three-phase inverter in response to the motor control signals of the processors 211 and 311. The three-phase inverter may convert direct current power, which is supplied from the battery of the vehicle, into alternating current power in response to a motor driving signal of the inverter driver and provide the converted alternating current power to the motors 136*a* and 136*b*.

The valve drive circuits 230 and 330 may control drive currents supplied to valves included in hydraulic control devices 140*a* and 140*b*, hydraulic circuits 150*a* and 150*b*, and dump control devices 180*a* and 180*b* in response to the valve control signals of the processors 211 and 311. For example, the valve drive circuits 230 and 330 may each include a switching element configured to control drive currents supplied to the valves, and a switching driver configured to control the switching element in response to the valve control signals of the processors 211 and 311.

Figure 11:
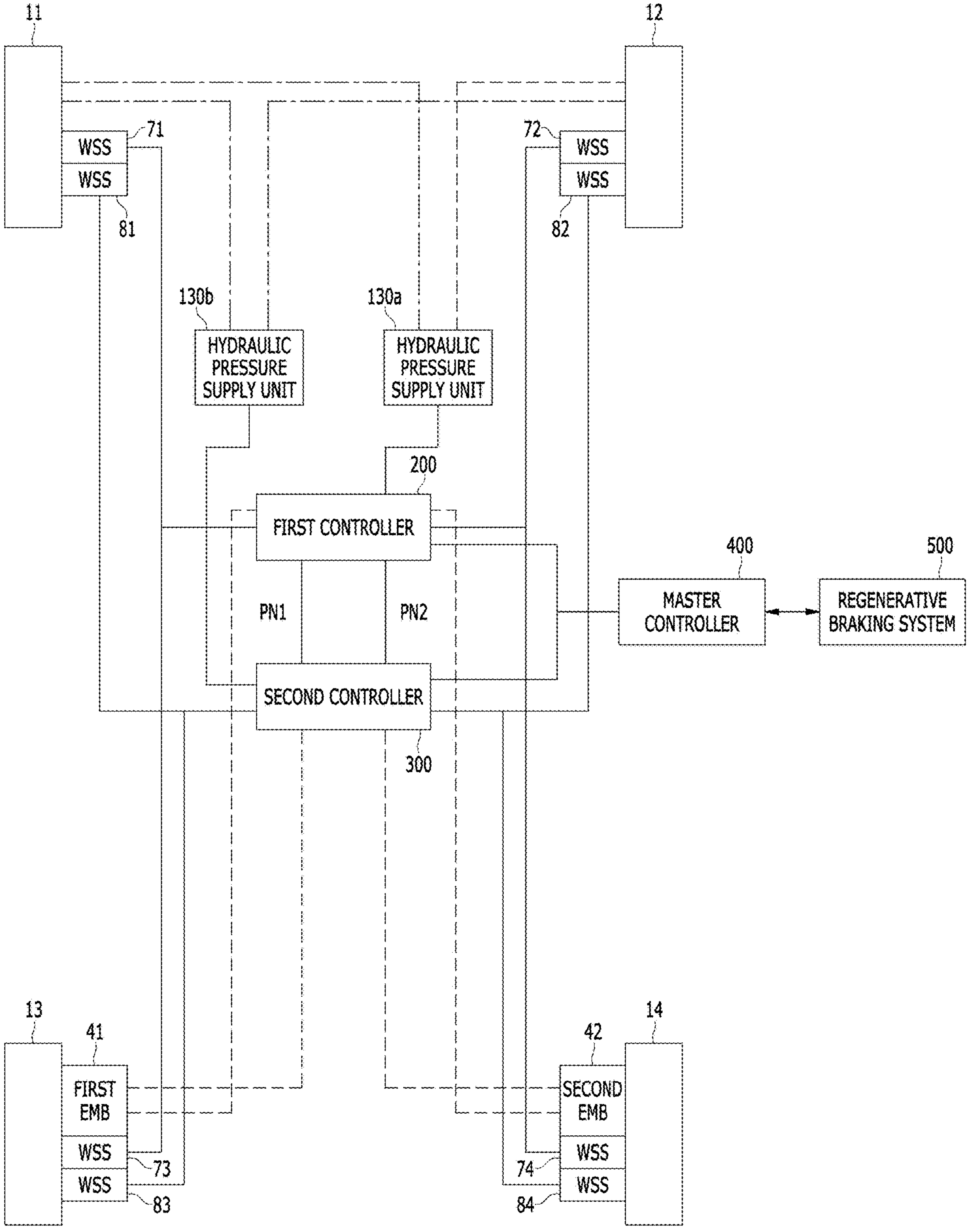
FIG. 11 is a view illustrating a brake system included in a vehicle according to a fourth embodiment.
Figure 12:
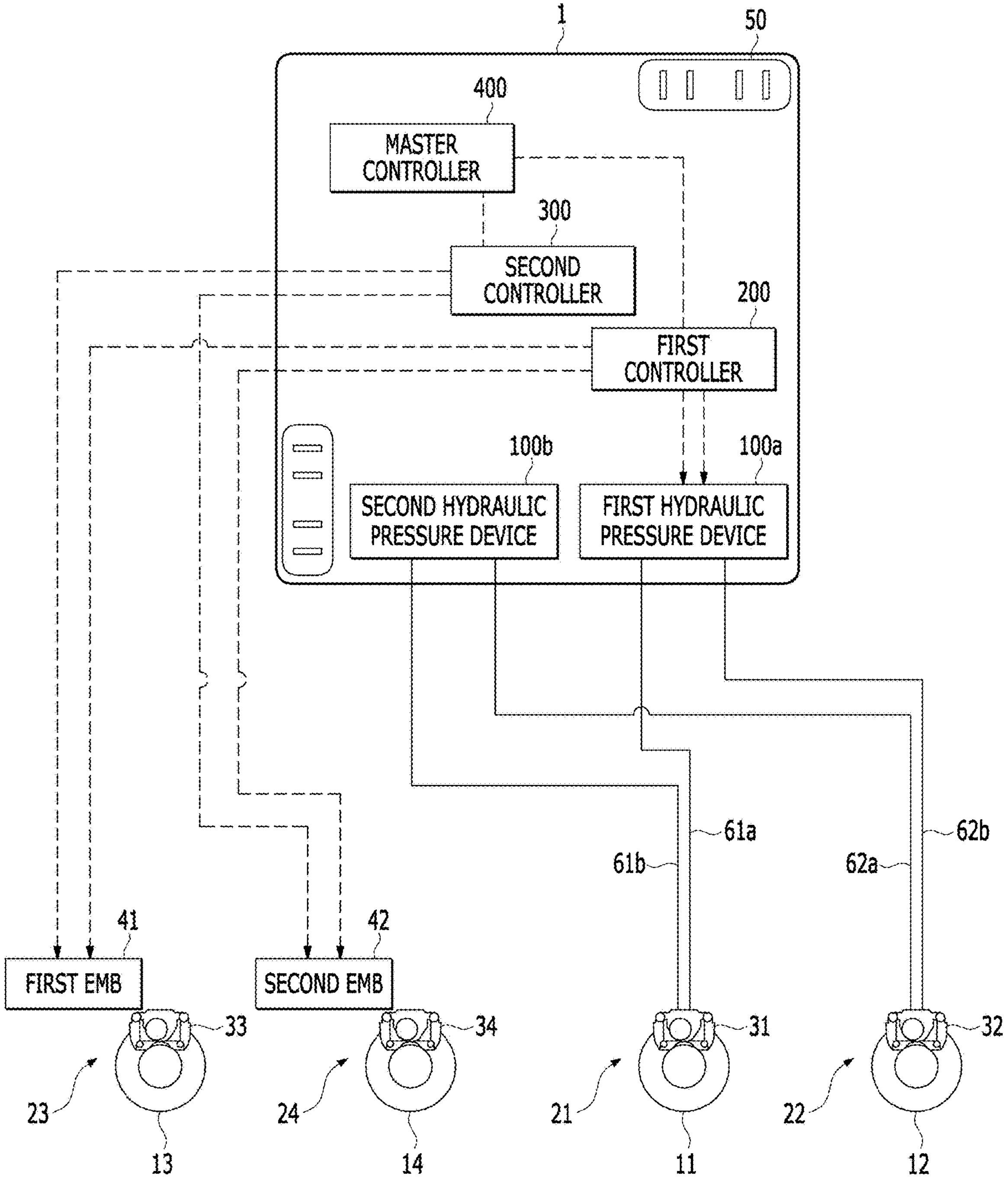
FIG. 12 is a view illustrating hydraulic control and electrical control of the brake system according to the fourth embodiment.
Figure 13:
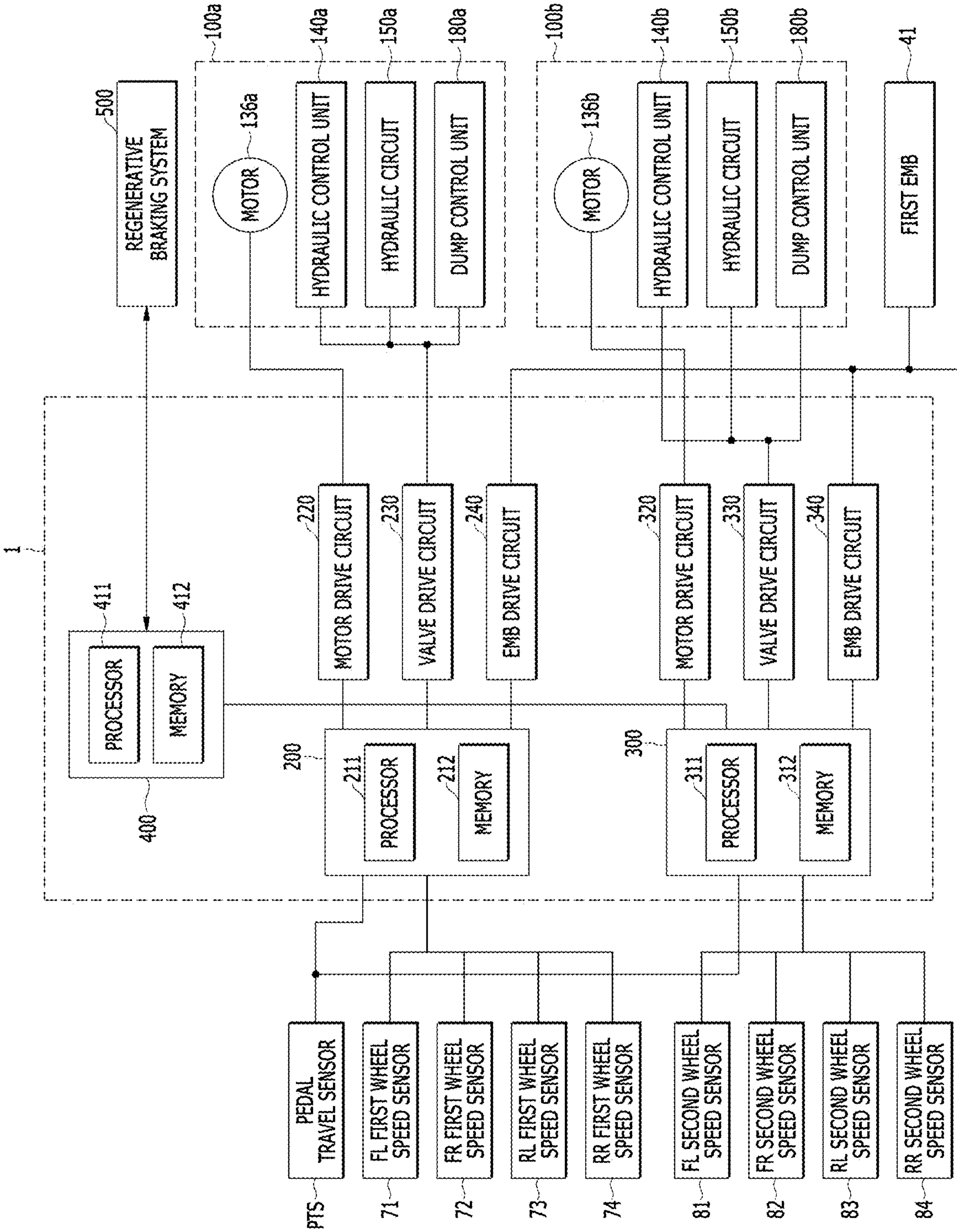
FIG. 13 is a view illustrating a control configuration of the brake system according to the fourth embodiment.

FIG. 11 is a view illustrating a brake system included in a vehicle according to a fourth embodiment, FIG. 12 is a view illustrating hydraulic control and electrical control of the brake system according to the fourth embodiment, and FIG. 13 is a view illustrating a control configuration of the brake system according to the fourth embodiment.

The brake system according to the fourth embodiment differs from the brake system according to the third embodiment in that the brake system according to the fourth embodiment further includes the master controller 400 connected to the first controller 200 and the second controller 300.

In order to avoid the repeated description, the description will focus on the master controller 400 added to the third embodiment.

The master controller 400 may be connected to the first controller 200 and the second controller 300 through a vehicle network. The master controller 400 may identify a state of the first controller 200 and a state of the second controller 300. In addition, the master controller 400 may impart a control authority for braking control to one of the first controller 200 and the second controller 300 that is in a normal state. For example, the master controller 400 may impart the control authority preferentially to the first controller 200 at ordinary times. When the master controller 400 identifies a failure of the first controller 200 while monitoring the state of the first controller 200 and the state of the second controller 300, the master controller 400 may impart the control authority for braking control to the second controller 300.

The master controller 400 may receive the first wheel speed signals and/or the second wheel speed signals from the first controller 200 and/or the second controller 300. While the first controller 200 performs the braking control, the master controller 400 may receive the first front wheel speed signals or the first rear wheel speed signals from the first controller 200 and perform the cooperative control together with another control system of the vehicle based on the first front wheel speed signals or the first rear wheel speed signals. For example, the master controller 400 may perform cooperative control for regenerative braking together with a regenerative braking system 500 based on the first front wheel speed signals or the first rear wheel speed signals. In this case, torque made by the regenerative braking during the regenerative braking may be generated by the regenerative braking system 500, and the master controller 400 may control the first controller 200 to compensate for an insufficient braking force.

In addition, while the second controller 300 performs the braking control, the master controller 400 may receive the second rear wheel speed signals or the second front wheel speed signals from the second controller 300 and perform the cooperative control together with another control system of the vehicle based on the second rear wheel speed signals or the second front wheel speed signals. For example, the master controller 400 may perform the cooperative control for regenerative braking together with the regenerative braking system 500 based on the second rear wheel speed signals or the second front wheel speed signals. In this case, torque made by the regenerative braking during the regenerative braking may be generated by the regenerative braking system 500, and the master controller 400 may control the second controller 300 to compensate for an insufficient braking force.

Figure 14:
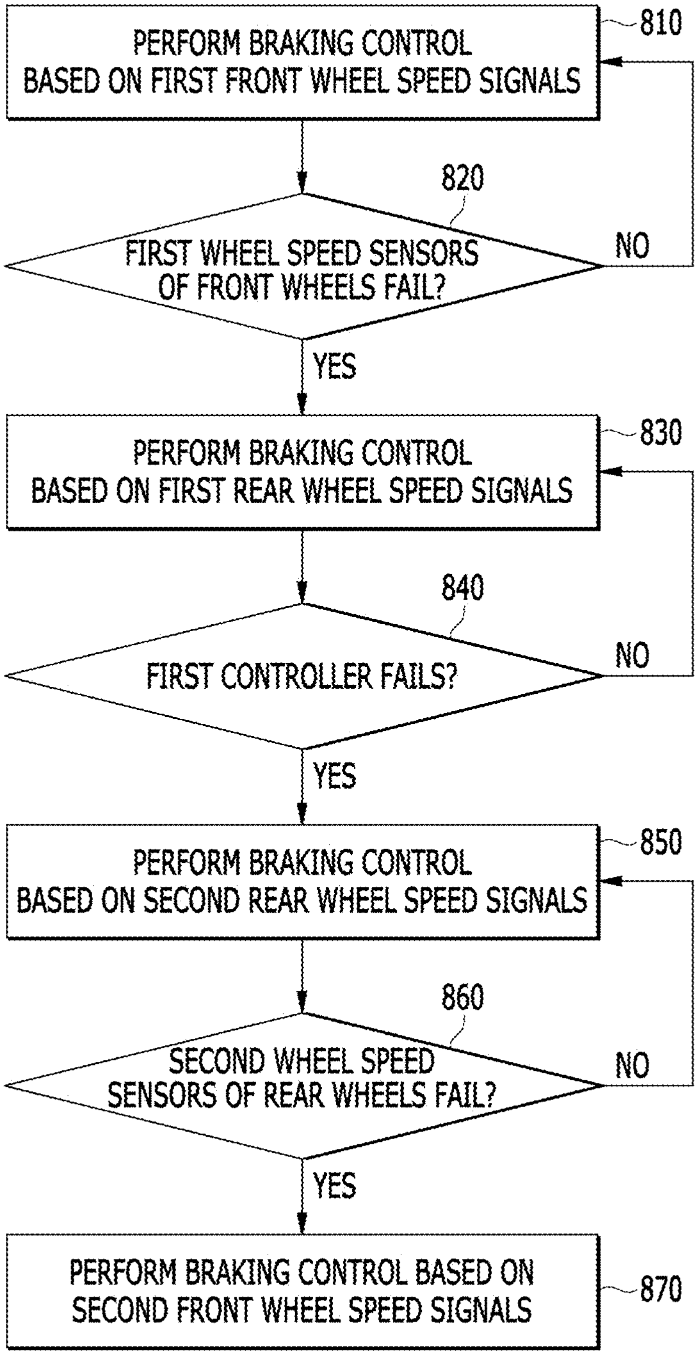
FIG. 14 is a view illustrating a braking control operation of a brake system according to another embodiment.

FIG. 14 is a view illustrating a braking control operation of a brake system according to another embodiment.

The brake system in FIG. 14 may include the first and second controllers 200 and 300 configured to perform braking control on the electrohydraulic brakes installed in the front wheels of the vehicle and the electromechanical brakes installed in the rear wheels of the vehicle based on the first wheel speed signals and the second wheel speed signals outputted from the first wheel speed sensors 71, 72, 73, and 74 and the second wheel speed sensors 81, 82, 83, and 84 installed in the wheels of the vehicle.

A method of controlling the above-mentioned brake system may include performing (810), by the first controller 200, the braking control based on the first front wheel speed signals outputted from the first wheel speed sensors 71 and 72 installed in the front wheels, performing, by the first controller, the braking control based on the first rear wheel speed signals outputted from the first wheel speed sensors 73 and 74 installed in the rear wheels when failures of the first wheel speed sensors 71 and 72 installed in the front wheels are identified (820), performing (850), by the second controller 300, the braking control based on the second rear wheel speed signals outputted from the second wheel speed sensors 83 and 84 installed in the rear wheels in response to a failure of the first controller 200 when the failure of the first controller 200 is identified (840), and performing (870), by the second controller 300, the braking control based on the second front wheel speed signals outputted from the second wheel speed sensors 81 and 82 installed in the front wheels when failures of the second wheel speed sensors 83 and 84 installed in the rear wheels are identified (860).

Figure 15:
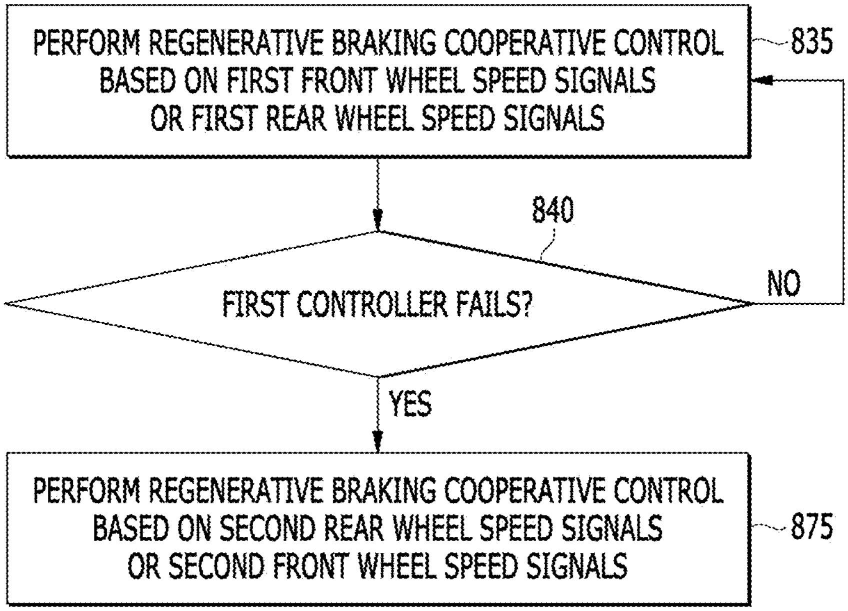
FIG. 15 is a view illustrating a cooperative control operation of a brake system according to another embodiment.

FIG. 15 is a view illustrating a cooperative control operation of a brake system according to another embodiment.

With reference to FIG. 15, the method may include performing (835), by the first controller 200, the cooperative control for regenerative braking based on the first front wheel speed signals or the first rear wheel speed signals, and performing (875), by the second controller 300, the cooperative control for regenerative braking based on the second rear wheel speed signals or the second front wheel speed signals when a failure of the first controller 200 is identified (840).

The above description is simply given for illustratively describing the technical spirit of the present disclosure, and those skilled in the art to which the present disclosure pertains will appreciate that various changes and modifications are possible without departing from the essential characteristic of the present disclosure. Therefore, the embodiments disclosed in the present disclosure are provided for illustrative purposes only but are not intended to limit the technical spirit of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

What is claimed is:

1. A brake system comprising:

first and second wheel speed sensors respectively installed in wheels of a vehicle;

electrohydraulic brakes respectively installed in front wheels of the vehicle;

electromechanical brakes (EMBs) respectively installed in rear wheels of the vehicle; and a first controller configured to perform braking control on the electrohydraulic brakes and the electromechanical brakes based on a first front wheel speed signals outputted from the first wheel speed sensors installed in the front wheel, wherein when a failure of the first wheel speed sensors installed in the front wheels is identified, the first controller performs the braking control on the electrohydraulic brakes and the electromechanical brakes based on the first rear wheel speed signals outputted from the first wheel speed sensors installed in the rear wheels.

2. The brake system of claim 1, further comprising:

a second controller configured to perform braking control on the electrohydraulic brakes and the electromechanical brakes based on a second rear wheel speed signals outputted from the second wheel speed sensors installed in the rear wheels in response to a failure of the first controller.

3. The brake system of claim 2, further comprising:

a first internal network configured to connect the first controller and the second controller, wherein the first controller and the second controller identify states thereof through the first internal network.

4. The brake system of claim 3, further comprising:

a second internal network configured to connect the first controller and the second controller, wherein the first controller and the second controller identify states thereof through the first internal network and the second internal network.

5. The brake system of claim 2, wherein when a failure of the second wheel speed sensors installed in the rear wheels are identified, the second controller performs the braking control on the electrohydraulic brakes and the electromechanical brakes based on second front wheel speed signals outputted from the second wheel speed sensors installed in the front wheels.

6. The brake system of claim 2, further comprising:

a first hydraulic pressure supply device configured to supply hydraulic pressure to the electrohydraulic brakes by being operated by a first motor, wherein the first controller controls the first motor so that the first hydraulic pressure supply device supplies the hydraulic pressure to the electrohydraulic brakes.

7. The brake system of claim 6, wherein the second controller controls the first motor so that the first hydraulic pressure supply device supplies the hydraulic pressure to the electrohydraulic brakes in response to the failure of the first controller.

8. The brake system of claim 6, further comprising:

a second hydraulic pressure supply device configured to supply hydraulic pressure to the electrohydraulic brakes by being operated by a second motor, wherein the second controller controls the second motor so that the second hydraulic pressure supply device supplies the hydraulic pressure to the electrohydraulic brakes.

9. The brake system of claim 1, wherein the first controller performs cooperative control for regenerative braking based on the first front wheel speed signals or the first rear wheel speed signals.

10. The brake system of claim 2, wherein the second controller performs cooperative control for regenerative braking based on the second rear wheel speed signals or the second front wheel speed signals in response to the failure of the first controller.

11. A method of controlling a brake system comprising first and second wheel speed sensors respectively installed in wheels of a vehicle, electrohydraulic brakes installed in front wheels of the vehicle, and electromechanical brakes installed in rear wheels of the vehicle, the method comprising:

performing, by a first controller, braking control on the electrohydraulic brakes and the electromechanical brakes based on first front wheel speed signals outputted from the first wheel speed sensors installed in the front wheels; and performing, by the first controller, braking control on the electrohydraulic brakes and the electromechanical brakes based on first rear wheel speed signals outputted from the first wheel speed sensors installed in the rear wheels when a failure of the first wheel speed sensors installed in the front wheels are identified.

12. The method of claim 11, further comprising:

identifying, by the first controller and a second controller, states thereof; and performing, by the second controller, braking control on the electrohydraulic brakes and the electromechanical brakes based on second rear wheel speed signals outputted from the second wheel speed sensors installed in the rear wheels in response to a failure of the first controller.

13. The method of claim 12, further comprising:

performing, by the second controller, braking control on the electrohydraulic brakes and the electromechanical brakes based on second front wheel speed signals outputted from the second wheel speed sensors installed in the front wheels when a failure of the second wheel speed sensors installed in the rear wheels are identified.

14. The method of claim 12, further comprising:

controlling, by the first controller, a first motor so that a first hydraulic pressure supply device operated by the first motor supplies hydraulic pressure to the electrohydraulic brakes.

15. The method of claim 14, further comprising:

controlling, by the second controller, the first motor so that the first hydraulic pressure supply device supplies hydraulic pressure to the electrohydraulic brakes in response to the failure of the first controller.

16. The method of claim 14, further comprising:

controlling, by the second controller, a second motor so that a second hydraulic pressure supply device operated by the second motor supplies hydraulic pressure to the electrohydraulic brakes in response to the failure of the first controller.

17. The method of claim 11, further comprising:

performing, by the first controller, cooperative control for regenerative braking based on the first front wheel speed signals or the first rear wheel speed signals.

18. The method of claim 12, further comprising:

performing, by the second controller, cooperative control for regenerative braking based on the second rear wheel speed signals or the second front wheel speed signals in response to the failure of the first controller.

19. A brake system comprising:

first and second wheel speed sensors respectively installed in wheels of a vehicle;

electrohydraulic brakes respectively installed in front wheels of the vehicle;

electromechanical brakes (EMBs) respectively installed in rear wheels of the vehicle;

a first controller configured to perform braking control on the electrohydraulic brakes and the electromechanical brakes based on first front wheel speed signals outputted from the first wheel speed sensors installed in the front wheels; and a second controller configured to perform braking control on the electrohydraulic brakes and the electromechanical brakes based on second rear wheel speed signals outputted from the second wheel speed sensors installed in the rear wheels in response to a failure of the first controller, wherein when a failure of the first wheel speed sensors installed in the front wheels are identified, the first controller performs the braking control on the electrohydraulic brakes and the electromechanical brakes based on first rear wheel speed signals outputted from the first wheel speed sensors installed in the rear wheels.

20. The brake system of claim 19, wherein when a failure of the second wheel speed sensors installed in the rear wheels are identified, the second controller performs the braking control on the electrohydraulic brakes and the electromechanical brakes based on second front wheel speed signals outputted from the second wheel speed sensors installed in the front wheels among the second wheel speed sensors.

* * * * *